(12) United States Patent
Ohashi et al.

(10) Patent No.: US 10,207,558 B2
(45) Date of Patent: Feb. 19, 2019

(54) VEHICLE-HEIGHT ADJUSTMENT SYSTEM

(71) Applicants: TOYOTA JIDOSHA KABUSHIKI KAISHA, Toyota-shi, Aichi-ken (JP); AISIN SEIKI KABUSHIKI KAISHA, Kariya-shi, Aichi-ken (JP)

(72) Inventors: Hideki Ohashi, Chiryu (JP); Katsuyuki Sano, Miyoshi (JP); Jun Tokumitsu, Toyota (JP); Ryo Kanda, Nissin (JP); Shogo Tanaka, Toyota (JP); Masaaki Oishi, Takahama (JP); Ken Ogue, Okazaki (JP)

(73) Assignees: TOYOTA JIDOSHA KABUSHIKI KAISHA, Toyota (JP); AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 15/449,427

(22) Filed: Mar. 3, 2017

(65) Prior Publication Data
US 2017/0259640 A1 Sep. 14, 2017

(30) Foreign Application Priority Data
Mar. 14, 2016 (JP) .................... 2016-049196

(51) Int. Cl.
*B60G 17/015* (2006.01)
*B60G 17/016* (2006.01)
(Continued)

(52) U.S. Cl.
CPC ....... *B60G 17/0155* (2013.01); *B60G 17/016* (2013.01); *B60G 17/0523* (2013.01);
(Continued)

(58) Field of Classification Search
CPC .............. B60G 17/0155; B60G 17/016; B60G 17/0523; B60G 2500/202; B60G 17/0565;
(Continued)

(56) References Cited

U.S. PATENT DOCUMENTS 4,695,074 A * 9/1987 Kobayashi ......... B60G 17/0155
280/124.16
4,709,934 A * 12/1987 Suzuki ................. B60G 17/016
280/5.514
(Continued)

FOREIGN PATENT DOCUMENTS

DE         10160972 C1    1/2003
DE     102008040054 A1    1/2010
(Continued)

OTHER PUBLICATIONS

U.S. Appl. No. 15/448,950, filed Mar. 3, 2017 in the name of Ohashi et al.
Jul. 13, 2018 Office Action issued in U.S. Appl. No. 15/448,950.

*Primary Examiner* — Darlene P Condra
(74) *Attorney, Agent, or Firm* — Oliff PLC

(57) ABSTRACT

A vehicle-height adjustment system includes: a vehicle-height adjustment actuator provided so as to correspond to a wheel; and a pressure-medium supply and discharge device configured to supply and discharge a pressure medium to and from the vehicle-height adjustment actuator. The pressure-medium supply and discharge device includes a tank configured to store the pressure medium. The vehicle-height adjustment system includes a tank-pressure controller configured to control a tank pressure based on at least one of a vehicle height for the wheel and an inside temperature. The tank pressure is a pressure of the pressure medium stored in the tank, and the inside temperature is a temperature in the vehicle-height adjustment system.

14 Claims, 14 Drawing Sheets

(51) Int. Cl.
*F16K 31/02* (2006.01)
*F16K 31/06* (2006.01)
*B60G 17/052* (2006.01)
*B60G 17/048* (2006.01)
*B60G 17/056* (2006.01)

(52) U.S. Cl.
CPC ............ *F16K 31/025* (2013.01); *F16K 31/06* (2013.01); *B60G 17/0485* (2013.01); *B60G 17/0525* (2013.01); *B60G 17/0565* (2013.01); *B60G 2400/71* (2013.01); *B60G 2500/202* (2013.01); *B60G 2500/204* (2013.01)

(58) Field of Classification Search
CPC ............ B60G 17/0525; B60G 17/0485; B60G 2400/71; B60G 2500/204; F16K 31/025; F16K 31/06
See application file for complete search history.

(56) References Cited

U.S. PATENT DOCUMENTS

| | | | | |
|---|---|---|---|---|
| 5,162,995 A | * | 11/1992 | Ikemoto | B60G 17/016 280/5.507 |
| 5,711,150 A | * | 1/1998 | Oshita | B60G 17/0523 60/407 |
| 6,116,586 A | * | 9/2000 | Westerkamp | B60G 17/0155 267/64.28 |
| 6,260,677 B1 | | 7/2001 | Hayakawa et al. | |
| 6,266,590 B1 | * | 7/2001 | Kutscher | B60G 17/0155 280/124.157 |
| 6,332,623 B1 | * | 12/2001 | Behmenburg | B60G 17/0155 267/64.11 |
| 6,354,617 B1 | * | 3/2002 | Behmenburg | B60G 17/0523 137/100 |
| 6,623,016 B2 | * | 9/2003 | Sulzyc | B60G 17/0185 280/124.16 |
| 2002/0166321 A1 | | 11/2002 | Oldenettel | |
| 2003/0107191 A1 | * | 6/2003 | Romer | B60G 17/052 280/5.514 |
| 2004/0188970 A1 | | 9/2004 | Matern et al. | |
| 2005/0035562 A1 | | 2/2005 | Meier et al. | |
| 2007/0228676 A1 | | 10/2007 | Stegmann | |
| 2007/0251575 A1 | | 11/2007 | Ilias et al. | |
| 2011/0093166 A1 | * | 4/2011 | Li | B60G 17/019 701/40 |
| 2012/0073669 A1 | * | 3/2012 | Diekmeyer | B60G 17/0523 137/1 |
| 2013/0320645 A1 | * | 12/2013 | Gall | B60G 11/27 280/124.16 |
| 2015/0145220 A1 | * | 5/2015 | Yellambalase | B60G 17/019 280/5.514 |
| 2016/0272035 A1 | * | 9/2016 | Oishi | B60G 17/0525 |
| 2016/0280034 A1 | | 9/2016 | Ogino et al. | |
| 2017/0182857 A1 | | 6/2017 | Ohashi et al. | |
| 2017/0274720 A1 | | 9/2017 | Iyoda et al. | |

FOREIGN PATENT DOCUMENTS

| | | |
|---|---|---|
| DE | 102010048252 A1 | 5/2011 |
| EP | 1 442 903 A1 | 8/2004 |
| EP | 1 504 929 A2 | 2/2005 |
| JP | H03-70615 A | 3/1991 |
| JP | 2007-203974 A | 8/2007 |
| JP | 4040898 B2 | 1/2008 |
| JP | 2012-025190 A | 2/2012 |
| JP | 1896878 B2 | 3/2012 |
| JP | 5047789 B2 | 10/2012 |
| JP | 2016-215963 A | 12/2016 |

* cited by examiner

UP CONTROL

DOWN CONTROL

AIR INTAKE CONTROL

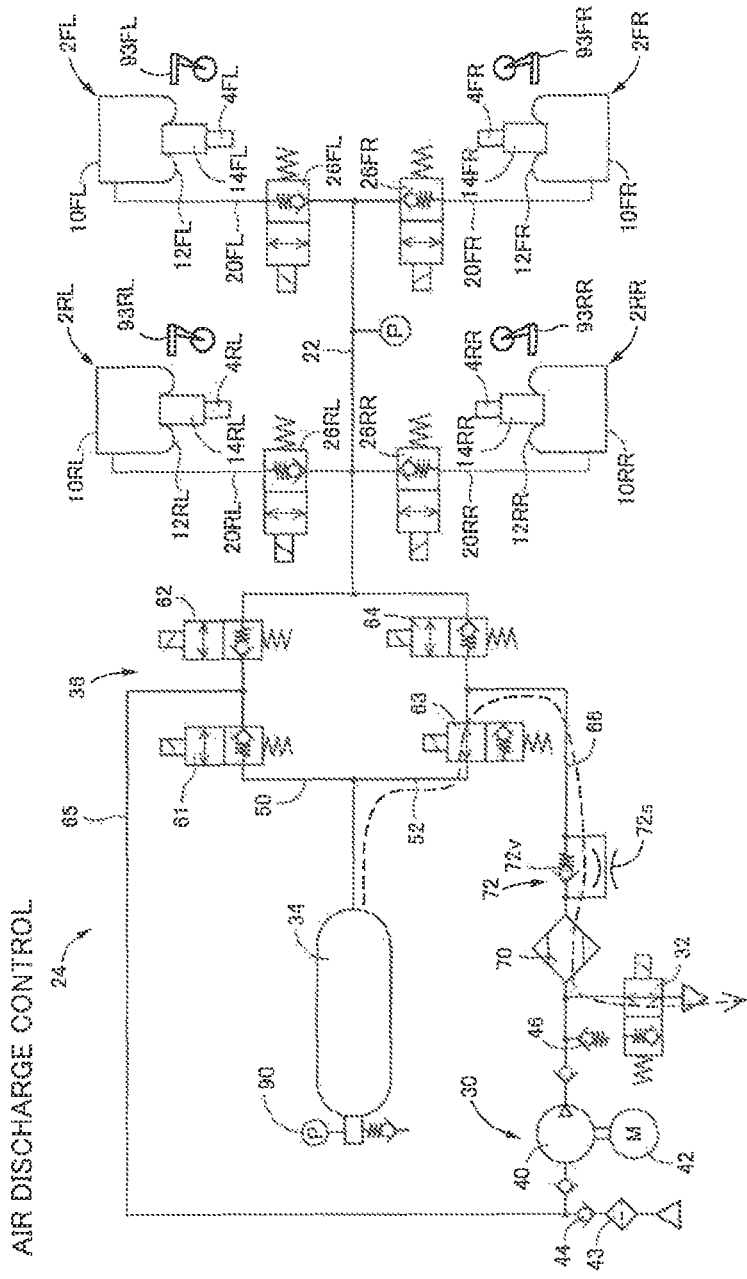

VEHICLE-HEIGHT ADJUSTMENT SYSTEM

CROSS REFERENCE TO RELATED APPLICATION

The present application claims priority from Japanese Patent Application No. 2016-049196, which was filed on Mar. 14, 2016, the disclosure of which is herein incorporated by reference in its entirety.

BACKGROUND

The following disclosure relates to a vehicle-height adjustment system including a tank for storing a pressure medium.

Patent Document 1 (Japanese Patent Application Publication No. 3-70615) discloses a vehicle-height adjustment system including a tank for storing air. In this vehicle-height adjustment system, a compressor is activated when a pressure of air stored in the tank becomes less than a lower limit value of a set range, and the compressor is stopped when the pressure of air stored in the tank reaches an upper limit value of the set range.

SUMMARY

An aspect of the disclosure relates to a vehicle-height adjustment system that appropriately controls a tank pressure which is a pressure of a pressure medium stored in a tank.

In one aspect of the disclosure, a vehicle-height adjustment system (hereinafter may be referred to as "system") is configured such that a tank pressure is controlled based on a state of the system. This vehicle-height adjustment system executes, based on a state of the system, at least one of (i) supply control for supplying a pressure medium to a tank when the tank pressure is less than a supply start threshold value and (ii) discharge control for discharging the pressure medium from the tank when the tank pressure is higher than the discharge start threshold value. The state of the system may be represented as an inside temperature, which is a temperature in the system, and a vehicle height substantially corresponding to an amount of pressure medium stored in the vehicle-height adjustment actuator, for example. The tank pressure changes with change of a temperature of air as the pressure medium in a state in which an amount of the pressure medium stored in the tank is constant. Also, even in the case where an amount of pressure medium in the overall vehicle-height adjustment system is constant, a change of the vehicle height changes the amount of the pressure medium stored in the tank, resulting in change of the tank pressure. Thus, the supply control and the discharge control may be executed though these controls are originally unnecessary, leading to increase in the number of operations of devices such as a compressor. Furthermore, the supply control and the discharge control may not be executed though these controls are necessary, leading to shortage or excessiveness of the tank pressure.

In contrast, it is possible to appropriately control the tank pressure based on, e.g., the vehicle height and the inside temperature of the system. The inside temperature of the system is a temperature of the pressure medium in the system. Examples of the inside temperature of the system include: a temperature of the pressure medium in the vehicle-height adjustment actuator; and a temperature of the pressure medium in a pressure-medium supply and discharge device (e.g., the tank and passages) configured to supply and discharge the pressure medium to and from the vehicle-height adjustment actuator. Also, the inside temperature of the system may be estimated based on an ambient temperature (an atmospheric temperature) outside the passages and the tank of the pressure-medium supply and discharge device.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which:

FIG. 4B is a view illustrating a state in the case where air is discharged from the tank;

FIGS. 6A and 6B are views each illustrating a relationship between a vehicle height and a tank pressure, wherein FIG. 6A is a view illustrating a change of the tank pressure in the case where the vehicle height is changed from a high vehicle height back to a standard vehicle height, and FIG. 6B is a view illustrating a change of the tank pressure in the case where the vehicle height is changed from a low vehicle height back to the standard vehicle height;

DETAILED DESCRIPTION OF THE EMBODIMENTS

Hereinafter, there will be described vehicle-height adjustment systems according to embodiments by reference to the drawings. The present vehicle-height adjustment systems utilize air as a pressure medium.

First Embodiment

Figure 1:
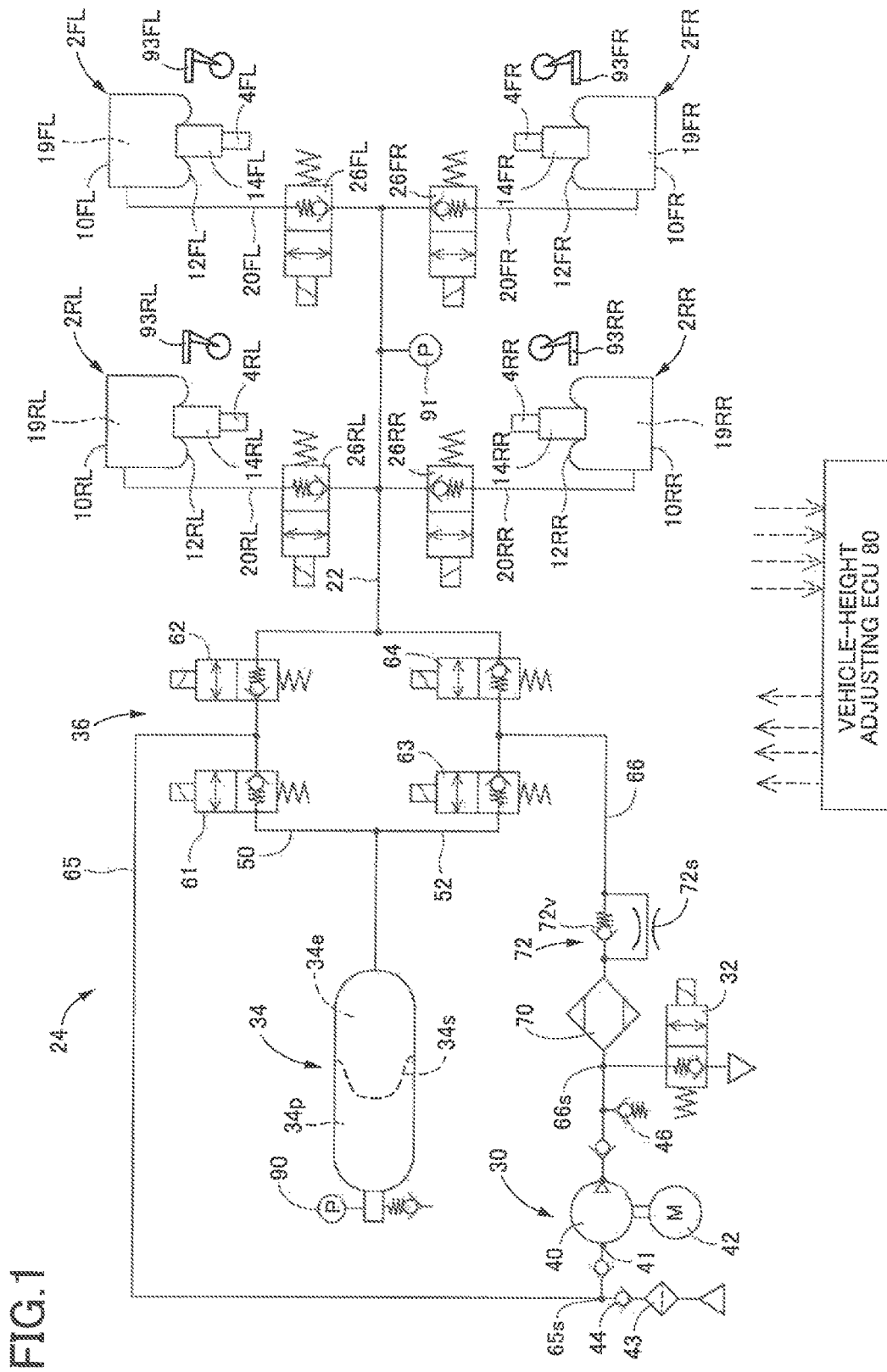
FIG. 1 is a circuit diagram of a vehicle-height adjustment system according to a first embodiment.

In a vehicle-height adjustment system according to a first embodiment, as illustrated in FIG. 1, air cylinders 2FL, 2FR, 2RL, 2RR each as a vehicle-height adjustment actuator and shock absorbers 4FL, 4FR, 4RL, 4RR are provided in parallel between a wheel-side member and a vehicle-body-side member, not illustrated. The air cylinders 2FL, 2FR, 2RL, 2RR respectively correspond to front left, front right, rear left, and rear right wheels provided on a vehicle. Likewise, the shock absorbers 4FL, 4FR, 4RL, 4RR respectively correspond to the front left, front right, rear left, and rear right wheels. Each of the shock absorbers 4FL, 4FR, 4RL, 4RR includes a cylinder body provided on the wheel-side member and a piston provided on the vehicle-body-side member. In the following description, each of the air cylinders 2 and other similar components will be referred with a corresponding one of suffixes (FL, FR, RL, RR) indicative of the respective wheels where the air cylinders 2 and other similar component should be distinguished by their respective wheel positions. On the other hand, where these devices are collectively referred, or the distinction is not required, each of the air cylinders 2 and other similar components will be referred without such suffixes. Each of the air cylinders 2 includes: a cylinder body 10 provided on the vehicle-body-side member; a diaphragm 12 fixed to the cylinder body 10; and an air piston 14 provided on the diaphragm 12 and the cylinder body of the corresponding shock absorber 4 so as to be immovable relative to the diaphragm 12 and the cylinder body in the up and down direction. Interiors of these components serve as an air chamber 19 as a pressure medium chamber. When air is supplied to or discharged from the air chamber 19, the air piston 14 is moved relative to the cylinder body 10 in the up and down direction. This movement moves the cylinder body and the piston of the shock absorber 4 relative to each other in the up and down direction. As a result, a distance between the wheel-side member and the vehicle-body-side member is changed, that is, a vehicle height is changed.

An air supply and discharge device 24 as a pressure-medium supply and discharge device is connected to the air chambers 19 of the respective air cylinders 2, via respective individual passages 20 and a common passage 22. Vehicle-height adjustment valves 26 are provided on the respective individual passages 20. Each of the vehicle-height adjustment valves 26 is a normally closed electromagnetic valve. When being in an open state, the vehicle-height adjustment valve 26 allows flow of air in opposite directions. When being in a closed state, the vehicle-height adjustment valve 26 prevents flow of air in a direction directed from the air chambers 19 to the common passage 22 but allows flow of air in the direction directed from the common passage 22 to the air chambers 19 when a pressure of air in the common passage 22 becomes higher than a pressure of air in the air chamber 19 by a set pressure.

The air supply and discharge device 24 includes a compressor device 30, an air-discharge valve 32, a tank 34, and a switching device 36. The compressor device 30 includes: a compressor 40; an electric motor 42 that drives the compressor 40; an intake valve 44 that is a check valve provided between an atmosphere and an intake-side portion 41 of the compressor 40; and a relief valve 46 provided on a discharge-side of the compressor 40. When a pressure of air in the intake-side portion 41 of the compressor 40 becomes lower than the atmospheric pressure, the compressor 40 sucks air from the atmosphere via a filter 43 and the intake valve 44. When a discharge pressure of the compressor 40 has increased, air is discharged to the atmosphere via the relief valve 46. The tank 34 stores air in a pressurized state. A pressure of the air in the tank 34 increases with increase in amount of air stored in the tank 34. The tank 34 includes: a storage chamber 34e for storing air; a pressure chamber 34p; a partition 34s that partitions the tank 34 into the storage chamber 34e and the pressure chamber 34p. Examples of the partition 34s include a diaphragm, bellows, and a piston. A resilient material or component, such as air and a spring, is provided in the pressure chamber 34p. Increase in amount of air stored in the storage chamber 34e increases the volume of the storage chamber 34e and reduces the volume of the pressure chamber 34p. As a result, the pressure of air in the pressure chamber 34p is increased, and the pressure of air in the storage chamber 34e is also increased. The pressure of air in the pressure chamber 34p and the pressure of air in the storage chamber 34e become equal to each other.

The switching device 36 is provided among the common passage 22, the tank 34, and the compressor device 30 to switch a direction in which air flows among them. As illustrated in FIG. 1, the common passage 22 and the tank 34 are connected to each other by a first passage 50 and a second passage 52 which are provided in parallel. Circuit valves 61, 62 are provided on the first passage 50 in series. Circuit valves 63, 64 are provided on the second passage 52 in series. A third passage 65 is connected to the first passage 50 at a position located between the two circuit valves 61, 62 and connected to an intake-side portion 41 of the compressor 40. A fourth passage 66 is connected to the second passage 52 at a position located between the two circuit valves 63, 64 and connected to an ejection-side portion of the compressor 40. Each of the circuit valves 61-64 is a normally closed valve. When being in an open state, each of the circuit valves 61-64 allows flow of air in opposite directions. When being in a closed state, each of the circuit valves 61-64 prevents flow of air from one side to the other side but allows flow of air from the other side to the one side when a pressure of air on the other side becomes higher than that on the one side by a set pressure. Each of the circuit valves 61, 63 in the closed state prevents air from flowing out of the tank 34. The circuit valve 62 in the closed state prevents air from flowing out of the common passage 22. The circuit valve 64 in the closed state prevents supply of air to the common passage 22.

The air-discharge valve 32 is a normally closed electromagnetic valve provided on the fourth passage 66 at a position located on an ejection-side of the compressor 40. When being in an open state, the air-discharge valve 32 allows discharge of air from the fourth passage 66 to the atmosphere. When being in a closed state, the air-discharge valve 32 prevents discharge of air from the fourth passage 66 to the atmosphere. The air-discharge valve 32 however allows supply of air from the atmosphere to the fourth passage 66 when a pressure of air in the fourth passage 66 becomes lower than the atmospheric pressure by a set pressure in the closed state. A dryer 70 and a flow restricting mechanism 72 are provided in series on the fourth passage 66 at positions located on a side of the air-discharge valve 32 which is located nearer to the second passage 52. The flow restricting mechanism 72 includes a pressure differential valve 72v and a restrictor 72s provided in parallel. The pressure differential valve 72v prevents flow of air from a second-passage side to a compressor side. When a pressure on the compressor side becomes higher than that on the second-passage side by a set pressure, the pressure differential valve 72v allows flow of air from the compressor 40 to the second passage 52.

Figure 2:
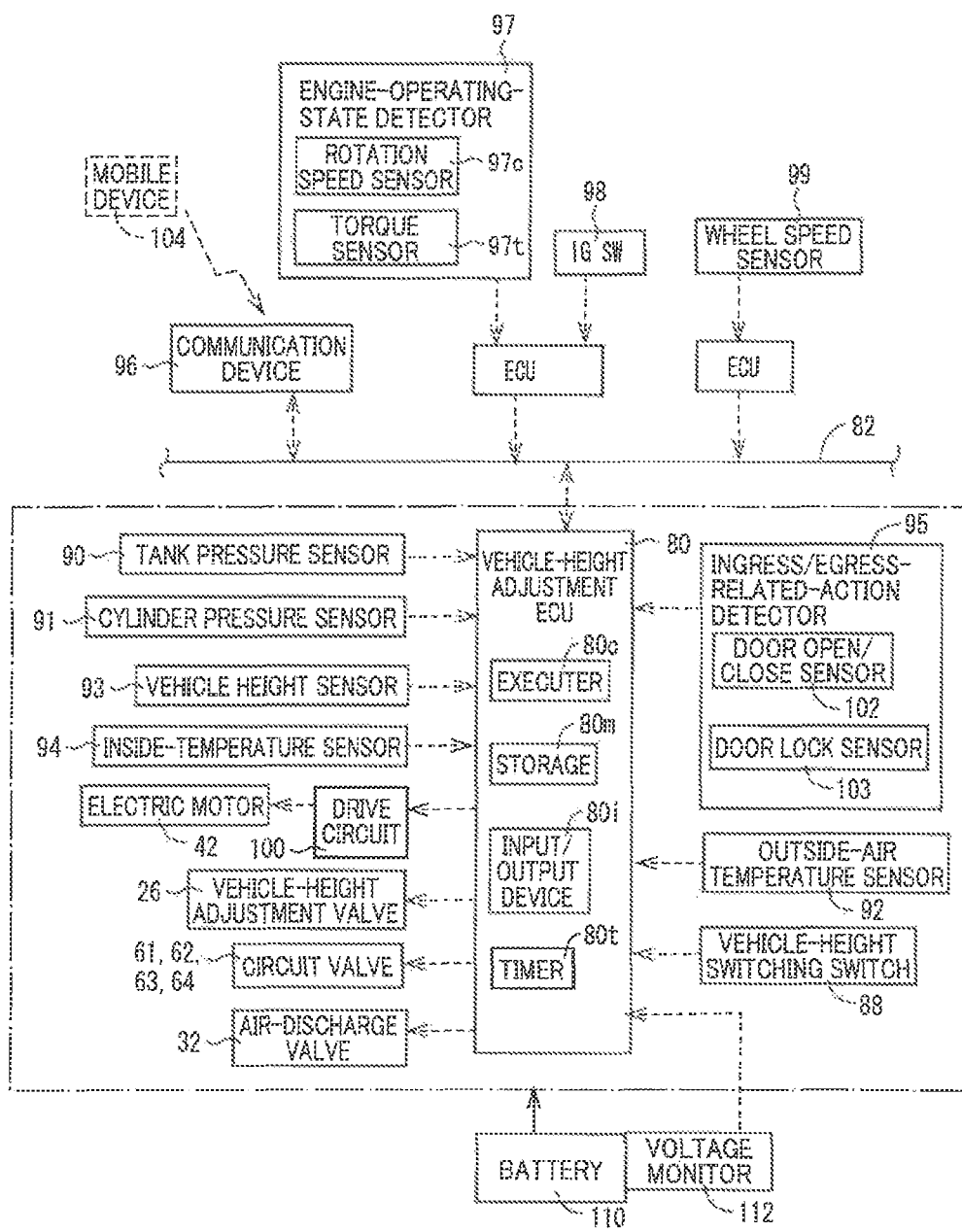
FIG. 2 is a conceptual view illustrating a vehicle-height adjustment ECU and devices connected thereto in the vehicle-height adjustment system.

In the present embodiment, the vehicle-height adjustment system (hereinafter may be simply referred to as "system") is controlled by a vehicle-height adjustment electronic control unit (ECU) 80 mainly constituted by a computer. The vehicle-height adjustment ECU 80 is communicable with devices, such as ECUs, via a controller area network (CAN) 82. As illustrated in FIG. 2, the vehicle-height adjustment ECU 80 includes an executer 80c, a storage 80m, an input/output device 80i, and a timer 80t. Devices connected to the input/output device 80i include a vehicle-height switching switch 88, a tank pressure sensor 90, a cylinder pressure sensor 91, vehicle height sensors 93, a second temperature sensor 94 as one example of an inside temperature obtainer, a first temperature sensor 92 that detects a temperature of outside air, and ingress/egress-related-action detectors 95. Also, devices including a communication device 96, an engine-operating-state detector 97, an ignition switch 98, and wheel speed sensors 99 are connected to the input/output device 80i via the CAN 82. The electric motor 42 is connected to the input/output device 80i via a drive circuit 100. The air-discharge valve 32, the vehicle-height adjustment valves 26, and the circuit valves 61-64 are connected to the input/output device 80i.

A driver operates the vehicle-height switching switch 88 to instruct a change of the vehicle height to one of "L" (Low), "N" (Normal), and "H" (High). The tank pressure sensor 90 detects a pressure of air stored in the tank 34 (hereinafter simply referred to as "tank pressure"). The cylinder pressure sensor 91 is provided on the common passage 22. When any of the vehicle-height adjustment valves 26 is open, the cylinder pressure sensor 91 detects a pressure of air in the air chamber 19 defined in the air cylinder 2 corresponding to the open vehicle-height adjustment valve 26 (the wheel). When all the vehicle-height adjustment valves 26 are closed, the cylinder pressure sensor 91 detects a pressure of the air in the common passage 22. The vehicle height sensors 93 are provided for the respective wheels 2FL, 2FR, 2RL, 2RR. Each of the vehicle height sensors 93 detects a deviation from a standard distance between the wheel-side member and the vehicle-body-side member (noted that the standard distance corresponds to a standard vehicle height) to detect a vehicle height which is a distance between the vehicle-body-side member and the wheel-side member, i.e., a height of the vehicle-body-side member from the wheel-side member. The first temperature sensor 92 detects an outside-air temperature which is a temperature of atmosphere outside the vehicle (ambient temperature). For example, the first temperature sensor 92 is mounted on a portion of a vehicle body at which the temperature is estimated to be substantially equal to the outside-air temperature. For example, the first temperature sensor 92 is mounted on a back side of a front bumper or a component for holding a door mirror. In the present embodiment, the second temperature sensor 94 detects a temperature of atmosphere near the tank 34, i.e., near an outer surface of the tank 34, (the ambient temperature). The ingress/egress-related-action detectors 95 detect the presence or absence of operation relating to getting on and off of the vehicle. The ingress/egress-related-action detectors 95 are provided respectively for a plurality of doors provided on the vehicle. Each of the ingress/egress-related-action detectors 95 includes: a door open/close sensor (a courtesy lamp sensor) 102 that detects opening and closing of a corresponding one of the doors; and a door lock sensor 103 that detects a locking operation and an unlocking operation for the corresponding door. Getting on and off and intention of start of driving are estimated based on opening and closing of the door and the locking and unlocking operations for the door, for example. The communication device 96 communicates with a mobile device 104 owned by, e.g., the driver in a predetermined communicable area. The locking and unlocking operations for the door may be performed based on the communication of the communication device 96. The engine-operating-state detector 97 includes a plurality of sensors including: a rotation speed sensor 97c that detects a rotation speed of an engine; and a torque sensor 97t that detects an output torque of the engine. Various states of the engine such as an operating state and a heating state are detected based on, e.g., the rotation speed and the output torque of the engine. The wheel speed sensors 99 are provided respectively for the front left, front right, rear left, and rear right wheels to detect rotational speeds of the respective wheels. A running speed of the vehicle is obtained based on the rotational speeds of the respective four wheels, for example. In the present embodiment, the vehicle-height adjustment system is operable by electric power provided from a battery 110. The voltage of the battery 110 is detected by a voltage monitor 112 that is connected to the vehicle-height adjustment ECU 80.

There will be next explained vehicle height adjustment. In the vehicle-height adjustment system configured as described above, during running of the vehicle, a target vehicle height is obtained for each of the front left, front right, rear left, and rear right wheels based on the running state of the vehicle, and the air supply and discharge device 24 and the vehicle-height adjustment valve 26 are controlled so as to bring an actual vehicle height for each wheel closer to the target vehicle height. This control increases a running stability of the vehicle. In a state in which the vehicle is stopped, the vehicle height adjustment is performed in the case where a predetermined condition is satisfied. Examples of this case include: a case where the vehicle-height switching switch 88 is operated; and a case where it is estimated that a person is to get on or off the vehicle.

Figure 3A:
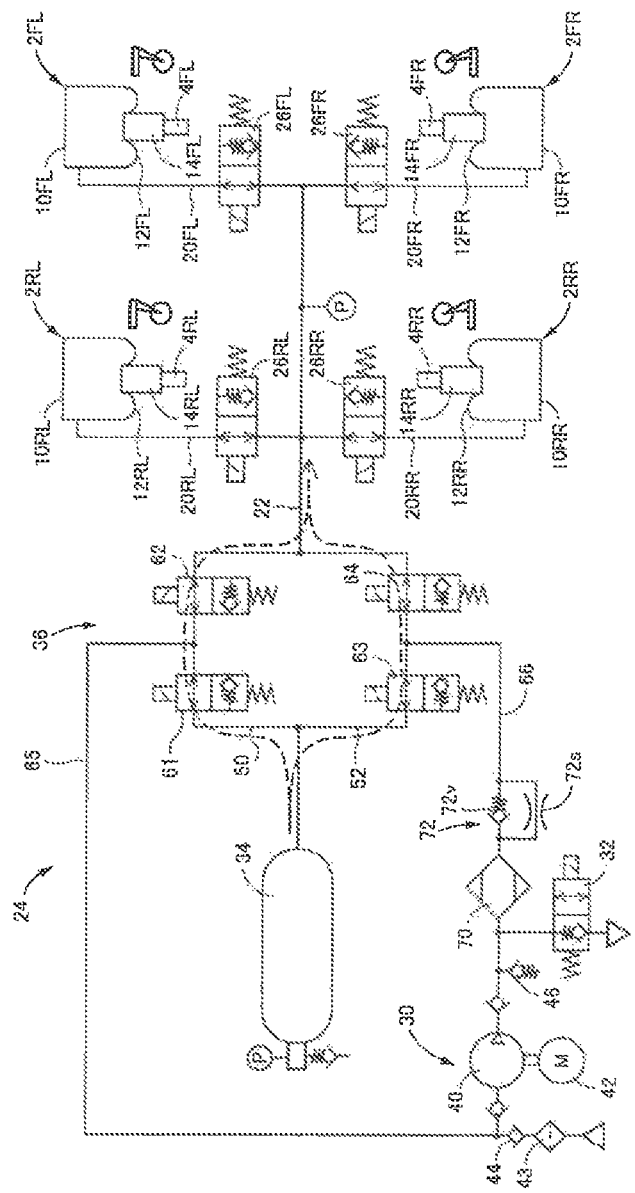
FIG. 3A is a view illustrating a state in the case where air is supplied to air cylinders of the vehicle-height adjustment system.
Figure 3B:
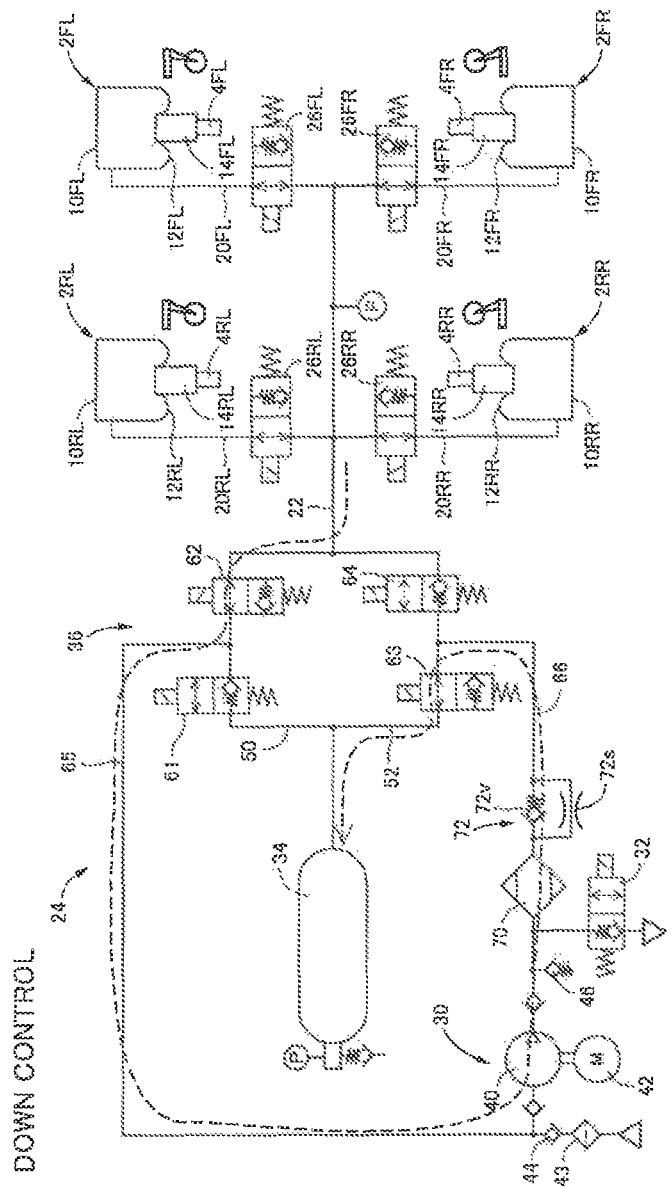
FIG. 3B is a view illustrating a state in the case where air is discharged from the air cylinders.

For example, in the case where the vehicle height is to be increased (noted that this control may be hereinafter referred to as "up control"), as illustrated in FIG. 3A, the circuit valves 61-64 are opened, and the vehicle-height adjustment valve 26 corresponding to each control target wheel is opened. In FIGS. 3A and 3B, the front left and right and rear left and right wheels are control target wheels, but the following explanation will be provided for one of the control target wheels for simplicity. The air stored in the tank 34 is supplied to the air chamber 19 defined in the air cylinder 2 provided for the control target wheel. As a result, the vehicle height for the control target wheel is increased. In the case where the vehicle height is to be reduced (noted that this control may be hereinafter referred to as "down control"), as illustrated in FIG. 3B, the electric motor 42 is driven to actuate the compressor 40, the circuit valves 61, 64 are closed, the circuit valves 62, 63 are opened, and the vehicle-height adjustment valve 26 corresponding to the control target wheel is opened. Air in the air chamber 19 defined in the air cylinder 2 is sucked from the compressor 40 and supplied to the tank 34.

Figure 4A:
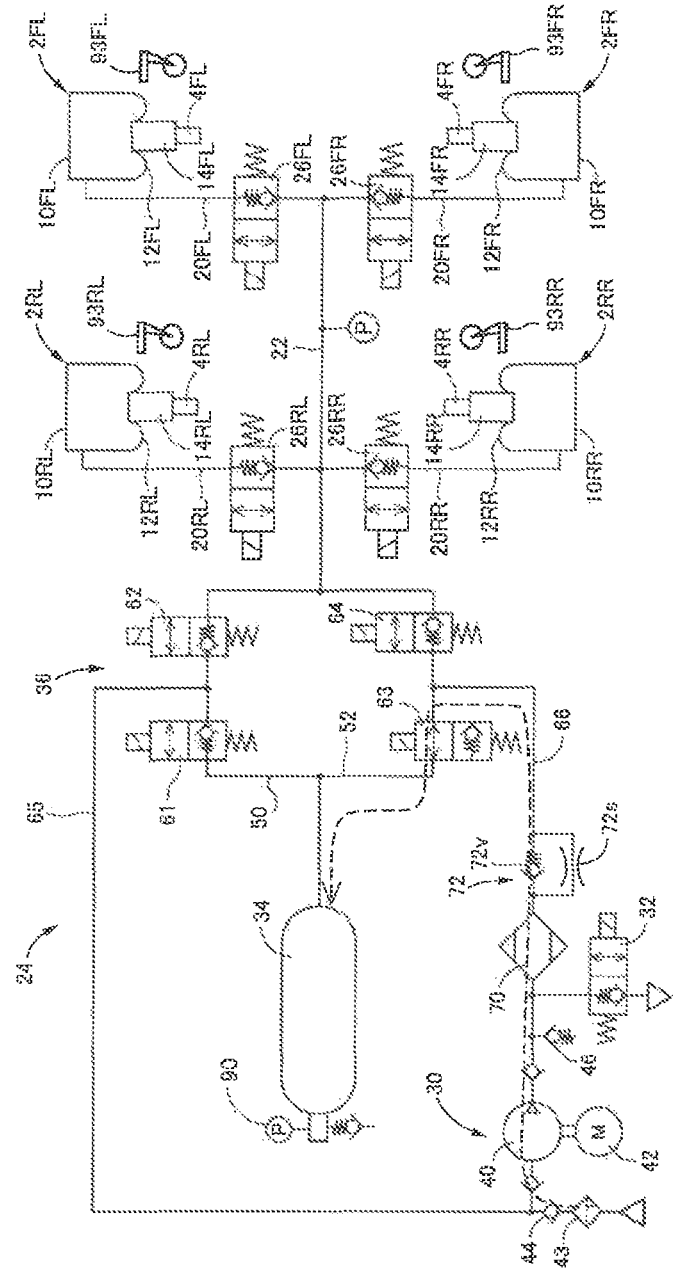
FIG. 4A is a view illustrating a state in the case where air is supplied to a tank of the vehicle-height adjustment system.

There will be next explained tank pressure control. The vehicle height adjustment is performed using the tank 34 as described above. The vehicle height adjustment includes control of the tank pressure which includes: air intake control as supply control for supplying air to the tank 34; and air discharge control as discharge control for discharging air from the tank 34. The air intake control is started when a tank pressure PT detected by the tank pressure sensor 90 becomes lower than an air-intake start threshold value Pi1 as a supply start threshold value. As illustrated in FIG. 4A, the electric motor 42 is driven to operate the compressor 40 in a state in which the circuit valves 61, 62, 64 are closed, and the circuit valve 63 is open. That is, an air-intake start processing is executed. Air is sucked from atmosphere by the compressor 40 via the intake valve 44 as a supply valve and stored into the tank 34. When the tank pressure PT becomes higher than an air-intake termination threshold value Pi2 as a supply termination threshold value which is larger than the air-intake start threshold value Pi1, the air intake control is terminated. In this termination, the electric motor 42 is stopped, and the circuit valve 63 is closed. That is, an air-intake termination processing is executed. The air discharge control is executed when the tank pressure PT becomes higher than an air-discharge start threshold value Pd1 as a discharge start threshold value. As illustrated in FIG. 4B, the air-discharge valve 32 as a discharge valve is opened, the circuit valves 61, 62, 64 are closed, and the circuit valve 63 is opened. That is, an air-discharge start processing is executed. The air in the tank 34 is discharged to the atmosphere via the dryer 70 and the air-discharge valve 32. When the tank pressure becomes lower than an air discharge termination threshold value Pd2 as a discharge termination threshold value, the air-discharge valve 32 is closed, and the circuit valve 63 is closed. That is, an air-discharge termination processing is executed.

There will be next explained effects of temperature. Even when the amount of air stored in the storage chamber 34e of the tank 34 is constant, the tank pressure changes with change of the temperature T of air stored in the storage chamber 34e (hereinafter may be referred to as "tank temperature T"). In the case where the tank 34 is sealed so as to serve as a single sealed space, and the amount of air stored in the storage chamber 34e is constant, the equation "PT·V=n·R·T" is established where T, PT, and V represent the tank temperature, the tank pressure, and the volume of the storage chamber 34e, respectively, and n represents a fixed value. According to this equation, it is obvious that the tank pressure PT is high in the case where the tank temperature T is high, but decrease in the tank temperature T decreases the tank pressure PT.

In the present embodiment, it is estimated that the tank temperature T is substantially equal to the atmospheric temperature around the tank 34 which is detected by the second temperature sensor 94, and a value detected by the second temperature sensor 94 is determined to the tank temperature T. Also, the tank temperature T is determined to an inside temperature Ti which is a temperature of air as a pressure medium in the system (Ti=T). The inside temperature Ti changes with change of an outside-air temperature To and increases due to operation of the engine. It is considered that the inside temperature Ti is substantially equal to the outside-air temperature To in the case where the vehicle is stopped for a long time (longer than or equal to a set length of time) in a non-operating state of the engine (e.g., a state in which the ignition switch 98 is OFF), for example, but the inside temperature Ti is higher than the outside-air temperature To in an operating state of the engine or in a period before the set length of time has passed from the stop of the engine. Also, as described above, a state in which the inside temperature Ti is higher than the outside-air temperature To due to operation of the engine is temporal, and the inside temperature Ti gradually lowers after the output of the engine is reduced or after the engine is stopped (that is, the ignition switch 98 is turned to OFF).

Figure 5:
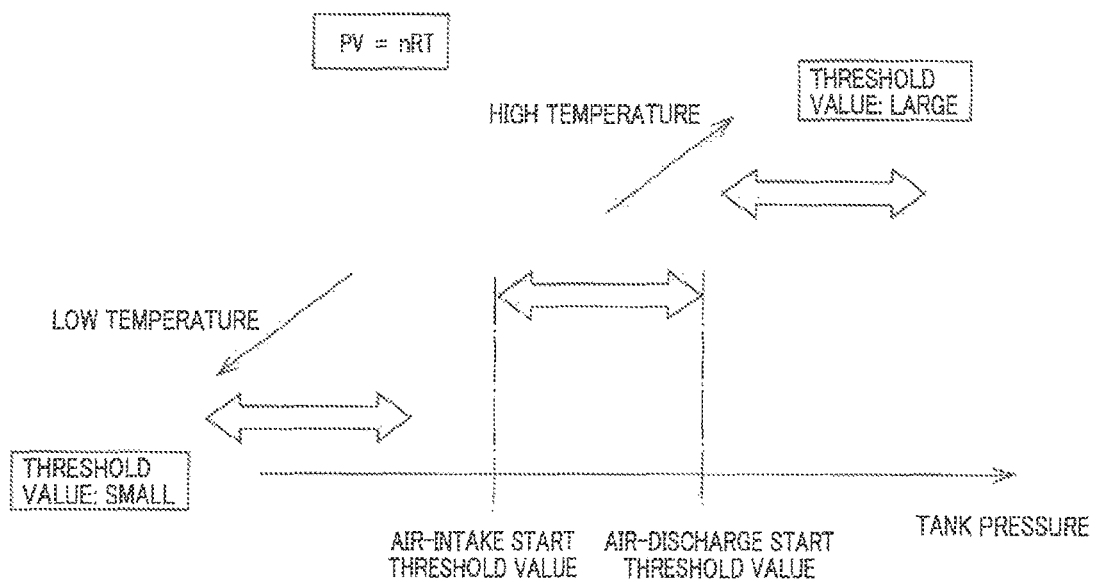
FIG. 5 is a view illustrating a relationship between a temperature and threshold values.

The compressor 40 may be operated unnecessarily in the case where the inside temperature Ti is lowered after the air discharge control is executed when the inside temperature Ti is high and the tank pressure PT becomes higher than the air-discharge start threshold value Pd1, for example. One example of the unnecessary operation of the compressor 40 is the air intake control executed when the tank pressure PT becomes lower than the air-intake start threshold value Pi1. Also, the air intake control is not started until the tank pressure PT becomes lower than the air-intake start threshold value Pi1, but decrease in the inside temperature Ti decreases the tank pressure PT. This may result in air shortages, leading to a longer length of time required for the up control and a long length of time required for the air intake control executed after the up control. To solve this problem, in the present embodiment, as illustrated in FIG. 5, each of values including the air-intake start threshold value Pi1 and the air-discharge start threshold value Pd1 is larger when the inside temperature Ti is high than when the inside temperature Ti is low.

It is not preferable to execute the air discharge control for a reason that the tank pressure PT is higher than the air-discharge start threshold value Pd1 in a state in which the inside temperature Ti is higher than the outside-air temperature To due to a high temperature of the system heated by, e.g., the engine. This is because the inside temperature Ti is temporarily high and lowers after the engine is stopped, for example. On the other hand, in the case where a temperature difference $\Delta T$ (=Ti−To) obtained by subtracting the outside-air temperature To from the inside temperature Ti is small, for example, in the case where the temperature difference $\Delta T$ is less than or equal to a set value $\Delta T th$ ($\Delta T \leq \Delta T th$), the tank pressure PT decreases by a small amount even when the inside temperature Ti has lowered to the outside-air temperature To. Furthermore, there is a possibility that the inside temperature Ti has changed with change of the outside-air temperature To, and thus there is a high possibility that this change is not temporal. Accordingly, it is considered that the necessity of consideration of the temperature difference $\Delta T$ in the tank pressure control is small. In contrast, in the case where the temperature difference $\Delta T$ is greater than the set value $\Delta T th$ ($\Delta T > \Delta T th$), the tank pressure PT decreases by a large amount when the inside temperature Ti has lowered to the outside-air temperature To. Furthermore, there is a high possibility that the inside temperature Ti is temporarily high with respect to the outside-air temperature To. Thus, it is considered that the necessity of consideration of the temperature difference $\Delta T$ in the tank pressure control is high. Accordingly, in the present embodiment, each of the values including the air-discharge start threshold value Pd1 and the air-intake start threshold value Pi1 is larger when the temperature difference $\Delta T$ is greater than the set value $\Delta T th$ than when the temperature difference $\Delta T$ is smaller than the set value $\Delta T th$.

As described above, it is possible to estimate the inside temperature Ti and the temperature difference $\Delta T$ based on the operating state of the engine. For example, it is possible to estimate that the inside temperature Ti is high in the case where the output of the engine (which is determined by, e.g., a rotation speed and a torque) is large during running of the vehicle or in the case where an idling time is longer than a set length of time during stop of the vehicle. Also, for example, it is possible to estimate that the temperature difference $\Delta T$ is greater than or equal to the set value $\Delta Tth$ in the case where an engine rotation speed N is greater than a set rotation speed Nth, and a torque TR is greater than a set torque TRth (N>Nth, TR>TRth) or in the case where an idling duration Z is longer than a set length of time Zth during stop of the vehicle (Z>Zth). For example, this system may be configured such that each of the set rotation speed Nth and the set torque TRth is set to a value large enough not to be output in a normal running state, and the set value $\Delta Tth$ is determined based on a temperature difference corresponding to the value.

There will be next explained effects of the vehicle height. Even in the case where the amount of air is constant in the overall system, the amount of air stored in the tank 34 changes with change of the vehicle height (corresponding to the amount of air in the air chamber 19 of the air cylinder 2), so that the tank pressure PT changes.

Figure 6A:
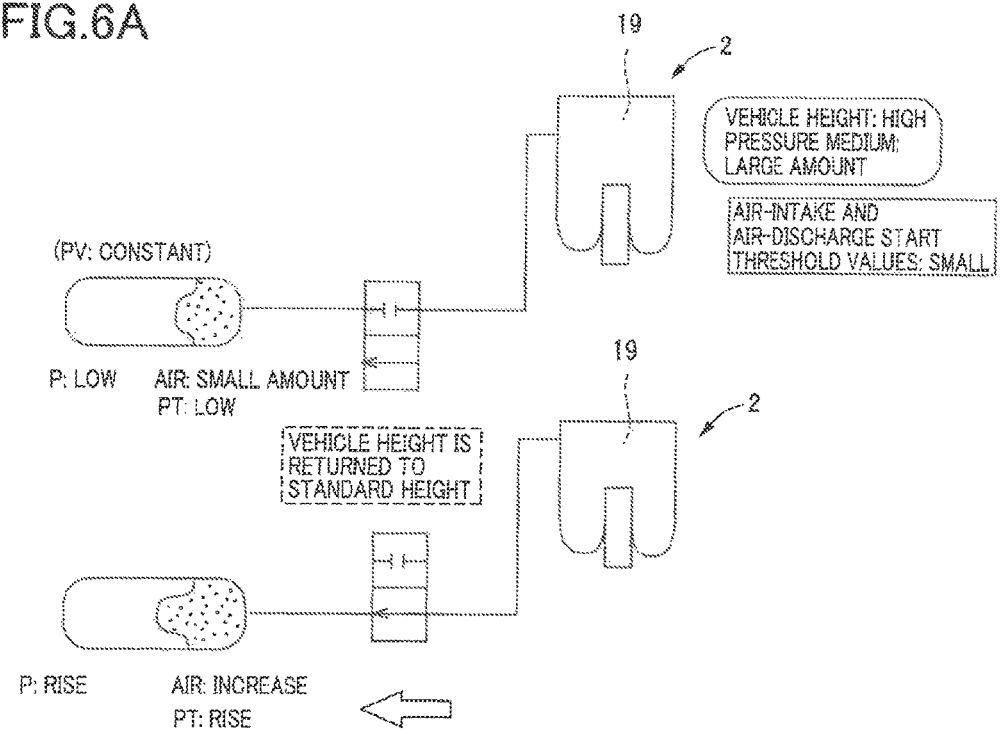
Figure 6B:
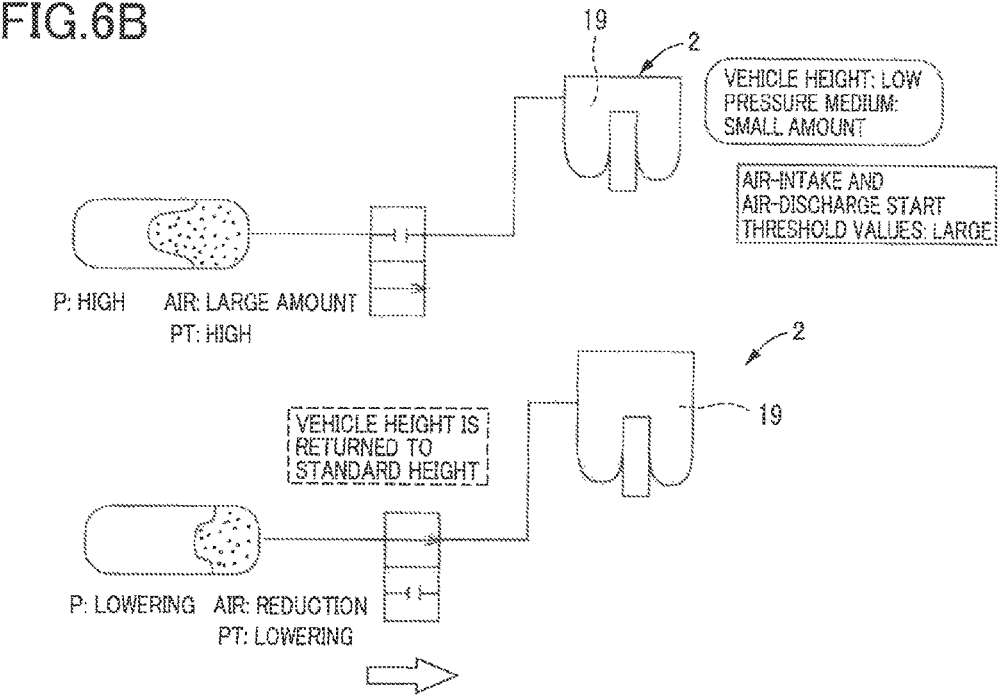

It is assumed that the system serves as a single sealed space, and the inside temperature Ti is constant. Communication between the air cylinder 2 and the tank 34 is established and interrupted by opening and closing of the valves including the vehicle-height adjustment valve 26 and the circuit valves 61-64. As illustrated in FIG. 6A, in the case where the vehicle height is high, a large amount of air is stored in the air chamber 19 of the air cylinder 2, and a small amount of air is stored in the tank 34, so that the tank pressure PT is low. However, when the vehicle height is thereafter changed back to a reference vehicle height (e.g., a standard vehicle height and a vehicle height desired by the driver) by the down control, air is transferred from the air cylinder 2 back to the tank 34, which increases the tank pressure PT. As illustrated in FIG. 6B, on the other hand, in the case where the vehicle height is low, a small amount of air is stored in the air chamber 19 of the air cylinder 2, and a large amount of air is stored in the tank 34, so that the tank pressure PT is high. However, when the vehicle height is thereafter changed back to the reference vehicle height by the up control, air is supplied from the tank 34 to the air cylinder 2, which reduces the tank pressure PT.

For example, when the tank pressure PT is increased by the down control after the air intake control executed in a state in which the tank pressure PT is lower than the air-intake start threshold value in the case where the vehicle height is high, a longer length of time may be required for the down control, and/or the air discharge control may be executed during or after the down control. That is, high vehicle height leads to execution of originally-unnecessary air intake control. When the tank pressure PT is reduced by the up control after the air discharge control executed in a state in which the tank pressure is higher than the air-discharge start threshold value in the case where the vehicle height is low, an air shortage is caused, leading to a longer length of time required for the up control. Furthermore, the compressor 40 needs to be operated to execute the air intake control after the up control, for example, resulting in further increase in the length of time required for the air intake control. That is, low vehicle height leads to execution of originally-unnecessary air discharge control, resulting in increase in the number of operations of the compressor 40. Accordingly, in the present embodiment, each of the values including the air-discharge start threshold value Pd1 and the air-intake start threshold value Pi1 is larger when the vehicle height is high than when the vehicle height is low.

There will be next explained determination of correction threshold values. In the present embodiment, a correction value $\Delta P$ is obtained based on parameters including the inside temperature Ti, the outside-air temperature To, a standard temperature Ts, an actual vehicle height H, and a standard vehicle height H0. Also, a correction air-intake start threshold value PAi1 a correction air-intake termination threshold value PAi2, a correction air-discharge start threshold value PAd1, and a correction air-discharge termination threshold value PAd2 (noted that these values may be hereinafter collectively referred to as "correction threshold values PAi, PAd") are obtained by adding the correction value $\Delta P$ to the air-intake start threshold value Pi1, the air-intake termination threshold value Pi2, the air-discharge start threshold value Pd1, and the air-discharge termination threshold value Pd2 (noted that these values may be hereinafter collectively referred to as "reference threshold values Pi, Pd"). The air discharge control and the air intake control are executed based on comparison between the tank pressure PT detected by the tank pressure sensor 90 and the correction threshold values PAi, PAd. Each of the reference threshold values Pi, Pd is a value that is set, assuming the case where the temperature of air in the tank is the standard temperature Ts as a reference temperature, and the vehicle height is the standard vehicle height H0 as the reference vehicle height, for example. In the present embodiment, the reference threshold values are set and stored in the storage 80$m$ in advance. The correction value $\Delta P$ may be a value that is larger when the inside temperature Ti is high than when the inside temperature Ti is low, that is larger when the temperature difference $\Delta T$ is large than when the temperature difference $\Delta T$ is small, and that is smaller when the vehicle height is high than when the vehicle height is low.

In determination of the correction value $\Delta P$, a correction value $\Delta Pi$ determined based on the inside temperature Ti (hereinafter may be referred to as "temperature-dependent correction value $\Delta Pi$), a correction value $\Delta Pt$ determined based on the temperature difference $\Delta T$ (hereinafter may be referred to as "temperature-difference-dependent correction value $\Delta Pt$"), and a correction value $\Delta Ph$ determined based on the vehicle height (hereinafter may be referred to as "vehicle-height-dependent correction value $\Delta Ph$") may be obtained. The correction value $\Delta P$ may be determined based on the temperature-dependent correction value $\Delta Pi$, the temperature-difference-dependent correction value $\Delta Pt$, and the vehicle-height-dependent correction value $\Delta Ph$. Specifically, the correction value $\Delta P$ may be a value determined based on the sum of these values $\Delta Pi$, $\Delta Pt$, and $\Delta Ph$ ($\Delta P=k\cdot(\Delta Pi+\Delta Pt+\Delta Ph)$) and may be a value determined based on these values $\Delta Pi$, $\Delta Pt$, and $\Delta Ph$ and ratios ($\Delta P=\alpha\Delta Pi+\beta\Delta Pt+\gamma\Delta Ph$, $\alpha+\beta+\gamma=1$), for example. A relationship among the correction value $\Delta P$, the actual vehicle heights HFL, HFR, HRL, HRR, the standard vehicle height H0, the inside temperature Ti, the outside-air temperature To, and the standard temperature Ts may be mapped and stored in advance to determine the correction value $\Delta P$ based on the map.

Figure 9:
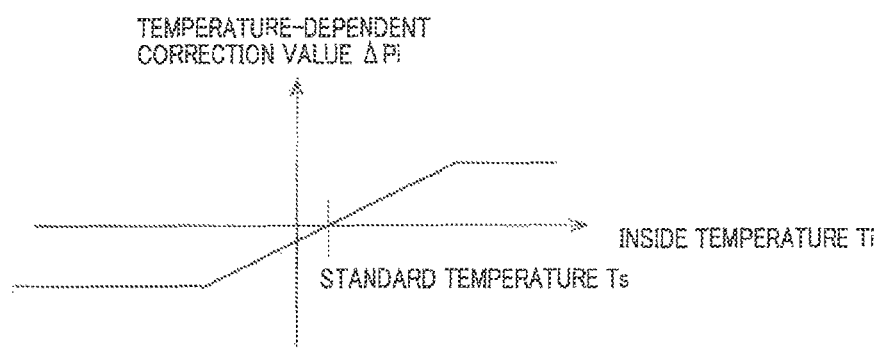
FIG. 9 is a map illustrating a temperature-dependent correction-value determination table stored in the storage.
Figure 10:
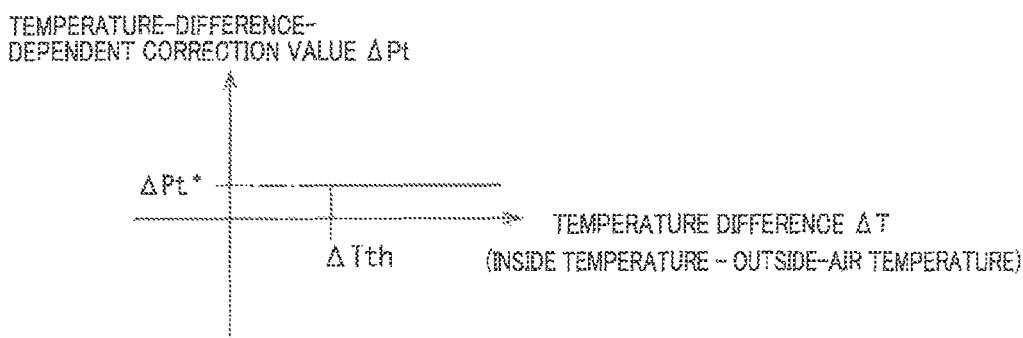
FIG. 10 is a map illustrating a temperature-difference-dependent correction-value determination table stored in the storage.
Figure 11:
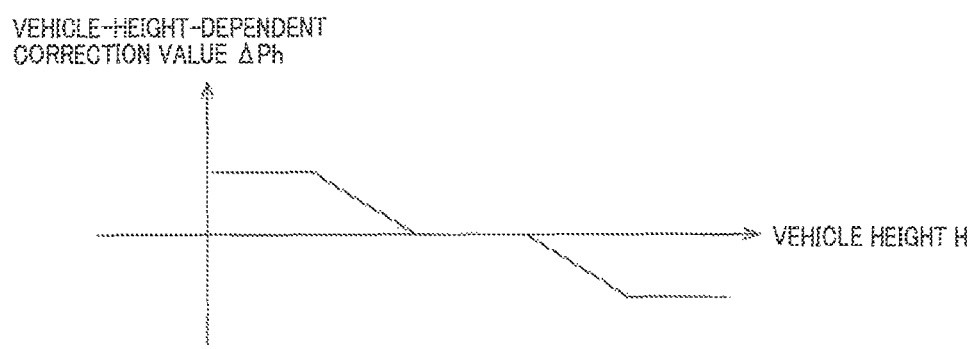
FIG. 11 is a map illustrating a vehicle-height-dependent correction-value determination table stored in the storage.

As illustrated in FIG. 9, the temperature-dependent correction value $\Delta Pi$ is larger when the inside temperature Ti is high than when the inside temperature Ti is low. Also, the temperature-dependent correction value $\Delta Pi$ is zero in the case where the inside temperature Ti is equal to the standard temperature Ts. An upper limit value and a lower limit value are set for the temperature-dependent correction value $\Delta Pi$ to avoid an excessively large difference between the reference threshold values Pi, Pd and the correction threshold values PAi, PAd due to an excessively large absolute value of the temperature-dependent correction value ΔPi. As illustrated in FIG. 10, the temperature-difference-dependent correction value ΔPt is larger when the temperature difference ΔT is large than when the temperature difference ΔT is small. The temperature-difference-dependent correction value ΔPt is zero when the temperature difference ΔT is smaller than or equal to the set value ΔTth, and the temperature-difference-dependent correction value ΔPt is constant (the fixed value) when the temperature difference ΔT is greater than the set value ΔTth. This is because the necessity of correction of the reference threshold values Pi, Pd is small in the case where an absolute value of a difference between the inside temperature Ti and the outside-air temperature To is small. As illustrated in FIG. 11, the vehicle-height-dependent correction value ΔPh is smaller when the vehicle height H is large than when the vehicle height H is small, but the vehicle-height-dependent correction value ΔPh is zero when the actual vehicle height H is equal to the standard vehicle height H0. It is noted that an upper limit value and a lower limit value are set for the vehicle-height-dependent correction value ΔPh.

Figure 8:
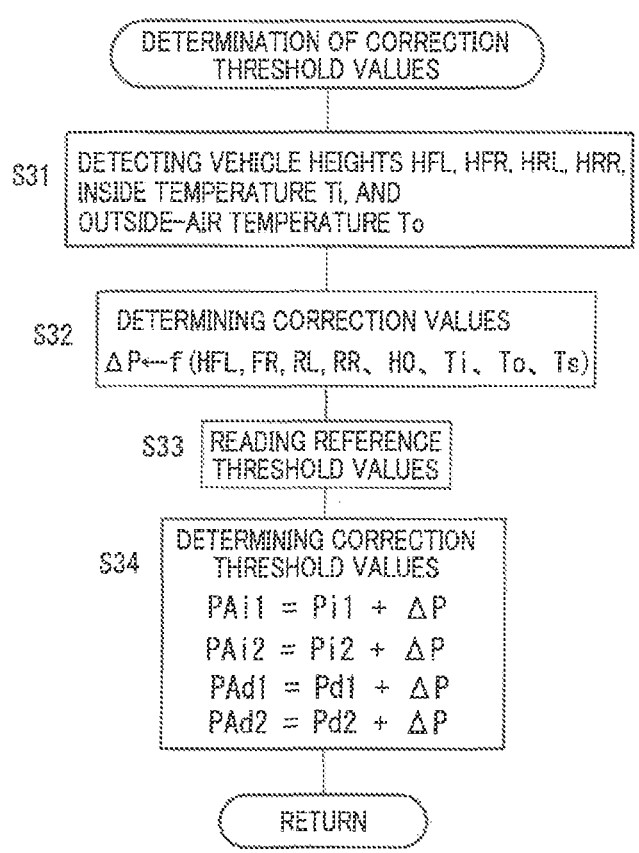
FIG. 8 is a flow chart illustrating a correction-threshold-value determination routine stored in the storage.

The correction threshold values are determined by execution of a routine represented by the flow chart in FIG. 8. At S31, the vehicle height sensors 93 respectively detect the actual vehicle heights HFL, HFR, HRL, HRR, each of which is an actual vehicle height for a corresponding one of the four wheels. Also, the second temperature sensor 94 and the first temperature sensor 92 respectively detect the inside temperature Ti and the outside-air temperature To. The correction value ΔP is obtained at S32 by substituting the actual vehicle heights HFL, HFR, HRL, HRR, the standard vehicle height H0, the inside temperature Ti, the outside-air temperature To, and the standard temperature Ts into the function f (ΔP=f(HFL, FR, RL, RR, H, Ti, To, Ts)). The correction value ΔP may be a positive value and a negative value. The correction value ΔP is set with consideration of (i) durability of the components of the vehicle-height adjustment system such as the air passages 50, 52, 65, 66, 20, 22 and (ii) requirements and demands for the vehicle height adjustment. At S33, the predetermined reference threshold values Pi, Pd are read. At S34, the correction threshold values PAi, PAd are determined by adding the correction value ΔP to the reference threshold values Pi, Pd.

$$PAi1=Pi1+\Delta P$$

$$PAi2=Pi2+\Delta P$$

$$PAd1=Pd1+\Delta P$$

$$PAd2=Pd2+\Delta P$$

Figure 7:
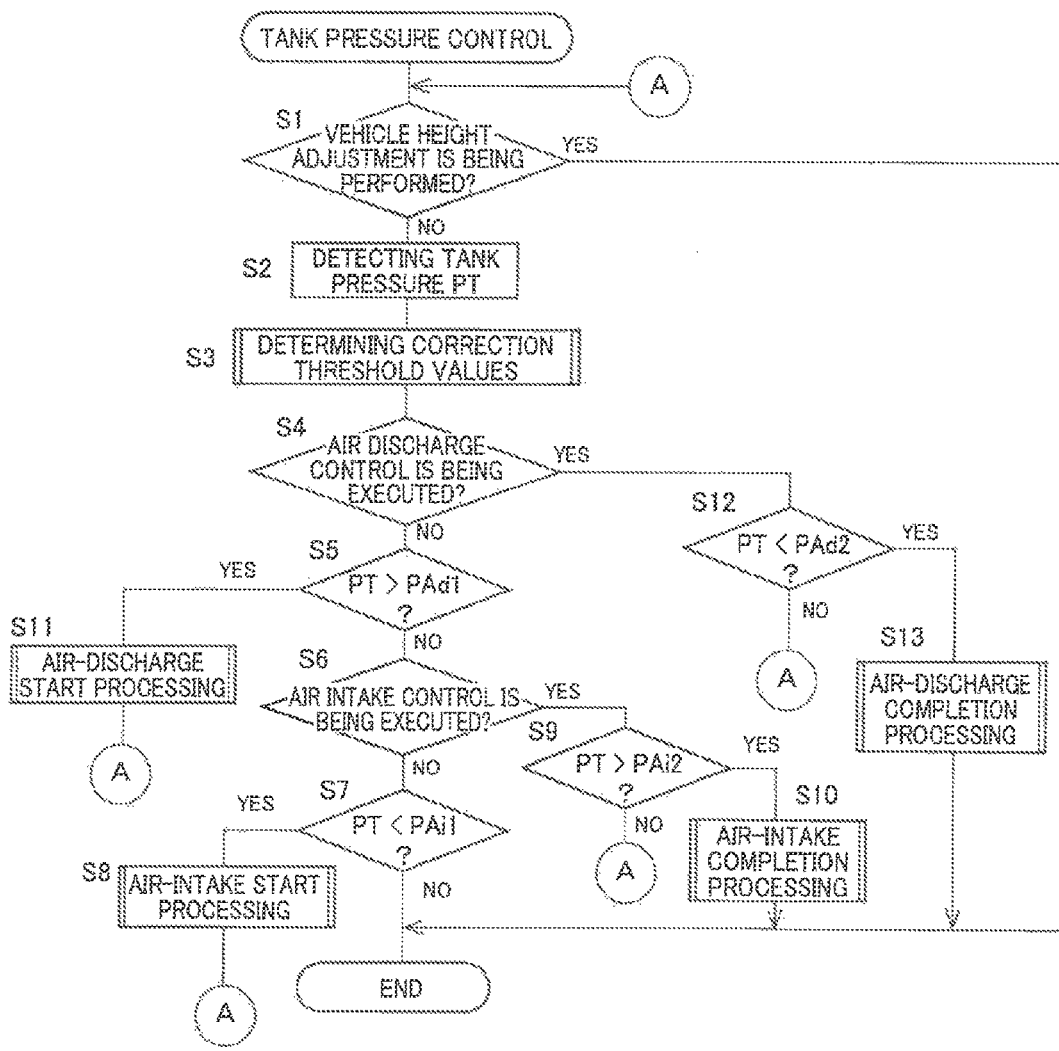
FIG. 7 is a flow chart illustrating a tank-pressure control program stored in a storage of the vehicle-height adjustment ECU.

There will be next explained the tank pressure control. The tank pressure is controlled by execution of a tank-pressure control program represented by the flow chart in FIG. 7. The tank-pressure control program is executed when a tank-pressure control command is output. The tank-pressure control command may be output when the ECU is started, when the vehicle is stopped, or each time when a predetermined length time has passed during operation of the engine or during the ON state of the ignition switch 98. At S1, it is determined whether the vehicle height adjustment is being performed. The tank pressure control is not executed during the vehicle height adjustment and is executed when the vehicle height adjustment is not being executed. At S2, the tank pressure PT is detected by the tank pressure sensor 90. At S3, the correction threshold values PAi, PAd are determined as described above. At S4, it is determined whether the air discharge control is being executed. When the air discharge control is not being executed, it is determined at S5 whether the tank pressure PT is higher than the correction air-discharge start threshold value PAd1. At S6, it is determined whether the air intake control is being executed. When the air intake control is not being executed, it is determined at S7 whether the tank pressure PT is lower than the correction air-intake start threshold value PAi1. When the tank pressure PT is lower than the correction air-discharge start threshold value PAd1 and higher than the correction air-intake start threshold value PAi1, this flow ends without execution of the air intake control or the air discharge control.

When the tank pressure PT is lower than the correction air-intake start threshold value PAi1, a positive decision (YES) is made at S7, and this flow goes to S8 at which the air-intake start processing is executed. In this processing, the circuit valve 63 is opened, and the compressor 40 is operated. Upon completion of the processing at S8, this flow returns to S1. Since the air intake control is started, a positive decision (YES) is made at the next determination at S6, and this flow goes to S9. At S9, it is determined whether the tank pressure PT is higher than the correction air-intake termination threshold value PAi2. When the tank pressure PT is lower than or equal to the correction air-intake termination threshold value PAi2, a negative decision (NO) is made at S9. The processings at S1-S6 and S9 are thereafter repeated. When the tank pressure PT becomes higher than the correction air-intake termination threshold value PAi2, the air-intake termination processing is executed at S10. In this processing, the compressor 40 is stopped, and the circuit valve 63 is closed. As a result, the air intake control is terminated, and this flow ends.

When the tank pressure PT becomes higher than the correction air-discharge start threshold value PAd1, a positive decision (YES) is made at S5, and the air-discharge start processing is executed at S11 in which the circuit valve 63 is opened, and the air-discharge valve 32 is opened. During the air discharge control, a positive decision (YES) is made at S4. Thus, it is determined at S12 whether the tank pressure PT is lower than the correction air-discharge termination threshold value PAd2. When the tank pressure PT is higher than or equal to the correction air-discharge termination threshold value PAd2, a negative decision (NO) is made at S12, and the processings at S1-S4 and S12 are repeated. When the tank pressure PT becomes lower than the correction air-discharge termination threshold value PAd2, the air-discharge termination processing is executed at S13. In this processing, the air-discharge valve 32 and the circuit valve 63 are closed, and this flow ends. During the vehicle height adjustment, on the other hand, a positive decision (YES) is made at S1, and the tank pressure control is not executed. In the case where a positive decision (YES) is made at S1 during the tank pressure control, the tank pressure control is terminated, and the devices including the vehicle-height adjustment valve 26, the circuit valves 61-64, and the electric motor 42 are controlled according to a vehicle-height control program, not illustrated. That is, a higher priority is given to the vehicle height adjustment.

In the present embodiment as described above, the reference threshold values Pi, Pd are corrected based on the parameters including the actual vehicle height H, the standard vehicle height H0, the inside temperature Ti, and the standard temperature Ts, and the air intake control and the air discharge control are executed by comparison between the tank pressure PT and each of the correction threshold values PAi, PAd. In other words, the actual tank pressure PT is converted to a tank pressure which is a tank pressure in the case where the inside temperature Ti is the reference temperature (the standard temperature Ts) and where the vehicle height is the reference vehicle height (the standard vehicle height H0), and then the converted tank pressure is compared with each of the reference threshold values Pi, Pd, whereby control substantially the same as the air intake control and the air discharge control is executed. As a result, it is possible to reduce increase in the length of time required for the vehicle height adjustment because of shortage or excessiveness of the tank pressure due to change of the tank pressure which is caused by disturbance (change of the tank pressure which is caused by the state of the system). Also, it is possible to reduce execution of originally-unnecessary air discharge control and air intake control to be executed, resulting in reduction of needless operations of the electric motor 42, the air-discharge valve 32, and the circuit valve 63. This reduces power consumption of the battery 110, increases a useful life of the battery 110, and increases a useful life of the components of the vehicle-height adjustment system, for example. This vehicle-height adjustment system may be configured such that the target vehicle height is set to be higher when the inside temperature Ti is high than when the inside temperature Ti is low in the case where the down control is executed. This configuration can reduce an amount of air to be supplied from the air cylinder 2 to the tank 34 and reduce an amount of increase in the tank pressure. Based on this and the addition of the vehicle-height-dependent correction value ΔPh to the air-discharge start threshold value Pd1 in the case where the vehicle height is high, it is possible to further reduce execution of unnecessary air discharge control. Furthermore, since the threshold value to be compared with the tank pressure PT is corrected, the calculation is easy when compared with the case where the tank pressure PT is converted to a value which is a value in the case of the standard temperature and the standard vehicle height.

In the present embodiment, the correction value ΔP is determined based on both of the inside temperature Ti and the temperature difference ΔT. For example, in the case where the inside temperature Ti changes with change of the outside-air temperature To, the temperature difference ΔT is small in some cases even when the inside temperature Ti is high. In the case where the outside-air temperature To is very low, the inside temperature Ti is not so high in some cases even when the temperature difference ΔT is large. Accordingly, it is possible to reduce execution of unnecessary air discharge control also in these cases, for example.

Also, the temperature-dependent correction value ΔPi is a correction value determined based on the feature in which the tank pressure is higher when the inside temperature Ti is high than when the inside temperature Ti is low. Furthermore, the temperature-dependent correction value ΔPi is a correction value based on a technical idea that the necessity of setting the correction value ΔP to a large value is generally higher when the inside temperature Ti is high than when the inside temperature Ti is low. The temperature-difference-dependent correction value ΔPt is a correction value based on lowering of the temperature in the case where the inside temperature Ti is lowered to the outside-air temperature To. Furthermore, the temperature-difference-dependent correction value ΔPt is a correction value based on a technical idea that the necessity of increasing the correction value ΔP is high in the case where the temperature difference ΔT between the inside temperature Ti and the outside-air temperature To is high. Thus, it is appropriate to determine the correction value ΔP based on both of the inside temperature Ti and the temperature difference ΔT.

In view of the above, a pressure-medium supplier is constituted by the compressor device 30, the intake valve 44, and the circuit valve 63, for example. A pressure-medium discharger is constituted by the air-discharge valve 32 and the circuit valve 63, for example. A tank-pressure controller is constituted by the tank pressure sensor 90, the second temperature sensor 94, the first temperature sensor 92, portions of the vehicle-height adjustment ECU 80 which store and execute the tank-pressure control program represented by the flow chart in FIG. 7, portions of the vehicle-height adjustment ECU 80 which store and execute the correction-threshold-value determination routine represented by the flow chart in FIG. 8, and a portion of the vehicle-height adjustment ECU 80 which stores the tables illustrated in FIG. 9, 10, for example. A discharge controller is constituted by portions of the tank-pressure controller which store and execute the processings at S1-S5 and S11-S13, for example. A supply controller is constituted by portions of the tank-pressure controller which store and execute the processings at S1-S3 and S6-S10, for example. A first inside-temperature-dependent changer and a second inside-temperature-dependent changer are constituted by a portion of the vehicle-height adjustment ECU 80 which stores the table in FIG. 9 and portions of the vehicle-height adjustment ECU 80 which store and execute the processing at S3 (at S31-S33), for example. A first temperature-difference-dependent changer and a second temperature-difference-dependent changer are constituted by a portion of the vehicle-height adjustment ECU 80 which stores the table in FIG. 10 and portions of the vehicle-height adjustment ECU 80 which store and execute the processing at S3 (at S31-S33), for example. A first vehicle-height-dependent changer and a second vehicle-height-dependent changer are constituted by a portion of the vehicle-height adjustment ECU 80 which stores the table in FIG. 11 and portions of the vehicle-height adjustment ECU 80 which store and execute the processing at S3 (at S31-S33), for example.

Figure 12:
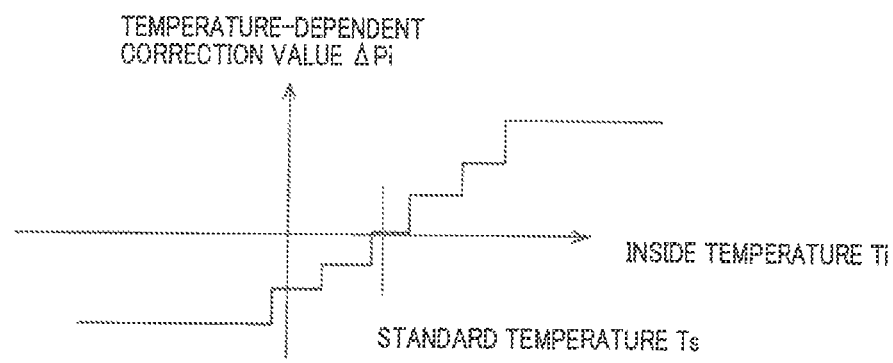
FIG. 12 is a map illustrating another temperature-dependent correction-value determination table stored in a storage of a vehicle-height adjustment ECU of a vehicle-height adjustment system according to another embodiment.
Figure 13:
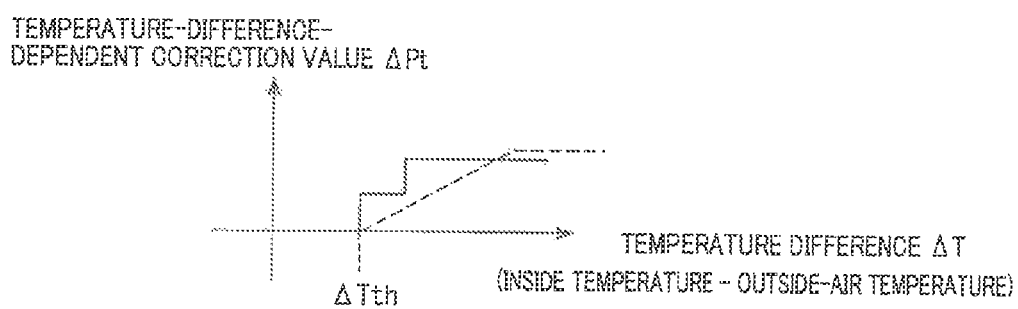
FIG. 13 is a map illustrating another temperature-difference-dependent correction-value determination table stored in the storage.
Figure 14:
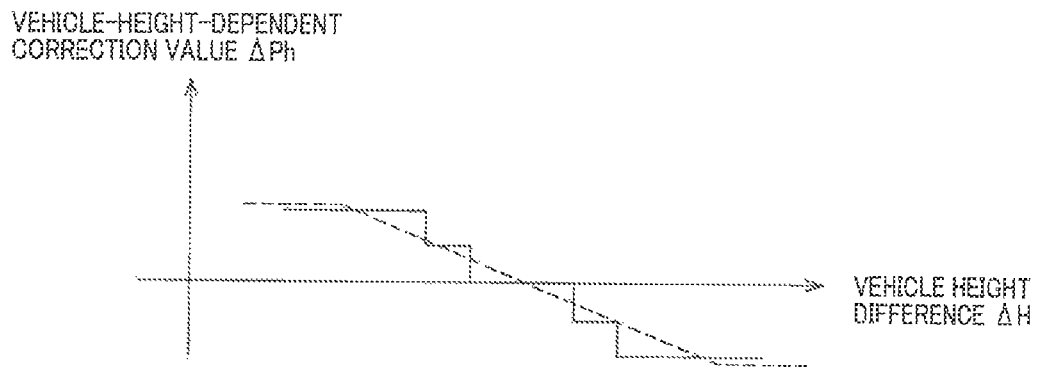
FIG. 14 is a map illustrating a vehicle-height-dependent correction-value determination table stored in the storage.

It is not essential to determine the correction value ΔP based on the inside temperature Ti, the temperature difference ΔT, and the vehicle height difference ΔH. The correction value ΔP may be determined based on one or more of the inside temperature Ti, the temperature difference ΔT, and the vehicle height difference ΔH. Also, the temperature-dependent correction value ΔPi may be a value which changes stepwise as illustrated in FIG. 12. The temperature-difference-dependent correction value ΔPt may be a value which changes stepwise as indicated by the solid line in FIG. 13 and may be a value which changes continuously as indicated by the broken line in FIG. 13 in the case where the temperature difference ΔT is greater than the set value ΔTth, for example. The vehicle-height-dependent correction value ΔPh may be a value which changes stepwise with change of the vehicle height H as indicated by the solid line in FIG. 14 and may be a value which changes continuously as indicated by the broken line in FIG. 14 even in the case where an absolute value of a difference between the actual vehicle height and the standard vehicle height is small.

It is not essential to obtain the actual vehicle height H, and the target vehicle height Href may be used as the actual vehicle height. This is because the actual vehicle height is in most cases controlled to the target vehicle height in the case where the vehicle height adjustment is not performed. Also, a vehicle height desired by the driver (i.e., a value related to instruction input to the vehicle-height switching switch 88) may be employed as the reference vehicle height. Also, it is not essential to provide the first temperature sensor 92, and a predetermined temperature such as the standard temperature may be used as the outside-air temperature To. Alternatively, outside-air-temperature information received over communication may be obtained and used as the outside-air temperature To. Also, the second temperature sensor 94 may be provided near any of the air passages 22, 50, 52, enabling accurate detection of the inside temperature Ti. Also, a pressure sensor for detecting a pressure of air may be provided in a small sealed space such as a portion of the air passage 50 which is located between the circuit valves 61, 62 and a portion of the air passage 52 which is located between the circuit valves 63, 64. This pressure sensor may detect the inside temperature by detecting a change of temperature of air (a change of the inside temperature) based on a change of the pressure value detected by the pressure sensor. For example, the outside-air temperature To at the point in time when it is possible to estimate that the inside temperature Ti is equal to the outside-air temperature To is set to an inside temperature T1. An inside temperature at the current time (Ti=T2) can be obtained based on the inside temperature T1 and a ratio between a pressure P1 at the time point and a pressure P2 at the current time.

$$P2/P1=T2/T1$$

$$Ti=T2=T1\cdot P2/P1$$

It is not essential to correct both of the threshold value to be used for the air intake control (i.e., the air-intake start threshold value and the air-intake termination threshold value) and the threshold value to be used for the air discharge control (i.e., the air-discharge start threshold value and the air-discharge termination threshold value). One of the threshold value to be used for the air intake control and the threshold value to be used for the air discharge control may be corrected. Also, the same correction value ΔP or different correction values ΔP may be used for the start threshold value (i.e., the air-intake start threshold value and the air-discharge start threshold value) and the termination threshold value (i.e., the air-intake termination threshold value and the air-discharge termination threshold value). Also, in the first embodiment, the correction threshold values PAi, Pad are obtained by adding the correction value ΔP to the respective reference threshold values Pi, Pd, and the reference threshold values Pi, Pd are changed by the respective correction threshold values PAi, Pad. However, the reference threshold values Pi, Pd may be changed by multiplying the reference threshold values Pi, Pd by a correction ratio. Also, the air intake control and the air discharge control may be executed by comparison between a threshold value and a value obtained by converting the value detected by the tank pressure sensor 90 to a tank pressure which is a value in the case of the standard temperature and the standard vehicle height.

Second Embodiment

Figure 15:
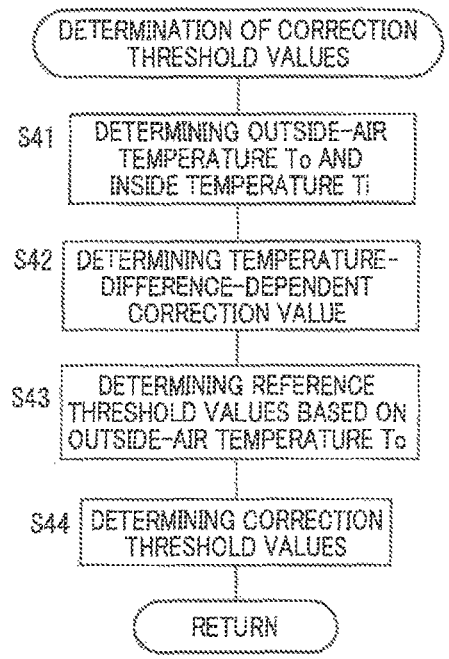
FIG. 15 is a flow chart illustrating a correction-threshold-value determination routine stored in a storage of a vehicle-height adjustment ECU of a vehicle-height adjustment system according to a second embodiment.

In this second embodiment, the correction threshold values PAi, Pad are determined according to a routine represented by the flow chart in FIG. 15. In the first embodiment, the reference threshold values Pi, Pd are set as the reference temperatures with reference to the case of the standard temperature and the standard vehicle height. In the present embodiment, the reference threshold values Pi, Pd are set as the reference temperatures with reference to the case of the outside-air temperature To and the standard vehicle height. Thus, the reference threshold value is a variable value which is determined based on the outside-air temperature To. Furthermore, the correction value ΔP is determined based on the temperature difference ΔT and set as the temperature-difference-dependent correction value ΔPt (ΔP=ΔPt). At S41, the outside-air temperature To and the inside temperature Ti are detected at the same period. At S42, the temperature-difference-dependent correction value ΔPt is determined. For example, the temperature-difference-dependent correction value ΔPt may be determined according to the table in FIG. 10 or FIG. 13. At S43, the reference threshold values Pi, Pd are determined based on the outside-air temperature To detected at S41. For example, a relationship between the outside-air temperature To as the reference temperature and each of the reference threshold values Pi, Pd is preferably mapped and stored in advance. For example, since each of the reference threshold values Pi, Pd may be set to a larger value when the outside-air temperature To is high than when the outside-air temperature To is low. At S44, the correction threshold values PAi, PAd are determined by adding the correction value ΔP to the respective reference threshold values Pi, Pd.

Figure 16:
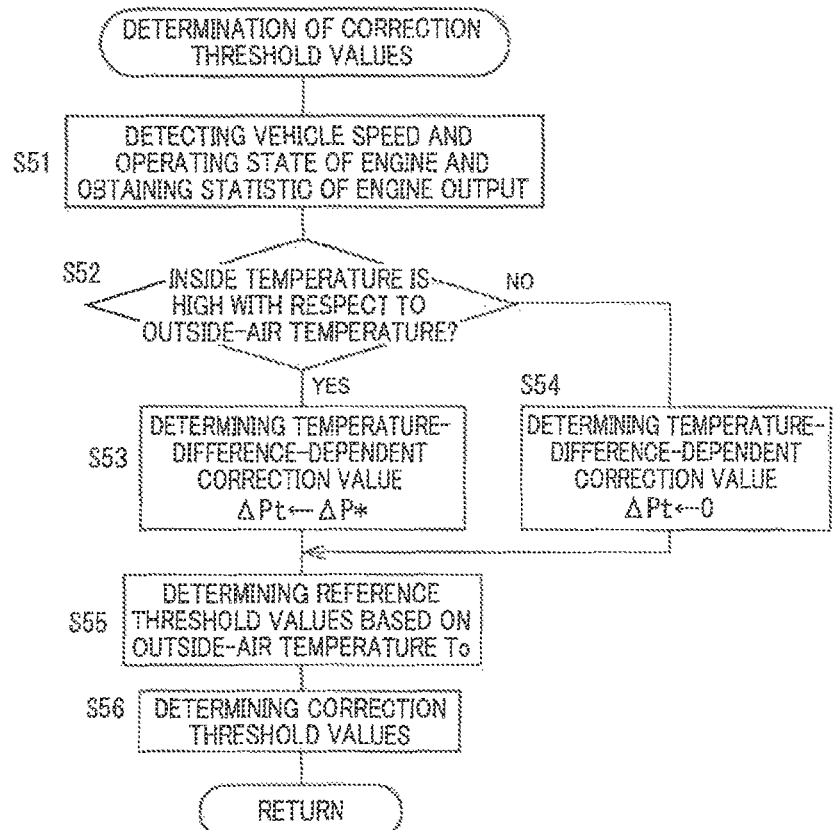
FIG. 16 is a flow chart illustrating another correction-threshold-value determination routine stored in a storage of a vehicle-height adjustment ECU of a vehicle-height adjustment system according to another embodiment.

It is also possible to estimate, based on the operating state of the engine, whether the temperature difference ΔT between the inside temperature Ti and the outside-air temperature To is greater than or equal to the set value ΔTth, in other words, whether a large amount of heat is generated by the engine, for example. For example, at S51 in the flow chart in FIG. 16, the torque and the rotation speed of the engine are detected based on the torque sensor 97t and the rotation speed sensor 97c, and the vehicle speed is obtained based on the values detected by the wheel speed sensors 99. In the case where it is determined based on the vehicle speed that the vehicle is stopped, an idling time of the engine is obtained. During running of the vehicle, statistics, such as the detected torque and the detected rotation speed (e.g., average values in a set length of time), are obtained. At S52, it is determined based on these values whether the temperature difference ΔT between the inside temperature Ti and the outside-air temperature To is greater than or equal to the set value ΔTth. For example, in the case where an output of the engine is large during running of the vehicle, specifically, in the case where the engine rotation speed N (a statistic) is greater than the set rotation speed Nth, and the torque TR (a statistic) is greater than the set torque TRth during running of the vehicle, or in the case where the idling duration Z is longer than the set length of time Zth when the vehicle is stopped, it is estimated that the system is heated by the engine, and thereby the inside temperature Ti is higher than the outside-air temperature To by the set value ΔTth, and it is determined at S53 that the temperature-difference-dependent correction value ΔPt is determined to a predetermined fixed value ΔPt* which is a value determined according to the table in FIG. 10, for example. In contrast, in the case where it is determined that the inside temperature Ti is not higher than the outside-air temperature To by the set value ΔTth, the temperature-difference-dependent correction value ΔPt is set to zero at S54. At S55 and S56, as in the above-described case, the reference threshold values Pi, Pd are determined with the reference temperature as the outside-air temperature To, and the correction threshold values PAi, PAd are determined by adding the temperature-difference-dependent correction value ΔPt to the respective reference threshold values Pi, Pd. Thus, without providing the first temperature sensor 92 and the second temperature sensor 94, it is possible to estimate, based on the operating state of the engine, whether the system has been heated by the engine installed in the vehicle, that is, whether the inside temperature Ti is higher than the outside-air temperature To by the set value ΔTth, for example. In the present embodiment, a temperature difference estimator is constituted by the engine-operating-state detector 97, the wheel speed sensors 99, and portions of the vehicle-height adjustment ECU 80 which store and execute the processings at S51 and S52 in the flow chart in FIG. 16. During running of the vehicle, the system is more easily cooled by winds when the vehicle speed is high than when the vehicle speed is low. Thus, in the case where the operating state of the engine is the same, it is possible to estimate that the temperature difference ΔT is smaller when the vehicle speed is high than when the vehicle speed is low. Also, a relationship between the temperature difference ΔT and the operating state of the engine and a relationship between the temperature difference ΔT and each of the operating state of the engine and the vehicle speed may be mapped and stored in advance.

Third Embodiment

Figure 17:
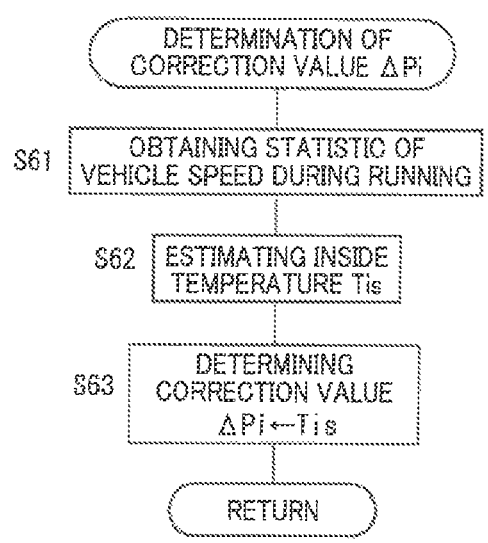
FIG. 17 is a flow chart illustrating a correction-threshold-value determination routine stored in a storage of a vehicle-height adjustment ECU of a vehicle-height adjustment system according to a third embodiment.

In this third embodiment, the temperature-dependent correction value ΔPi as the correction value ΔP is determined according to a temperature-dependent correction-threshold-value determination routine represented by the flow chart in FIG. 17. At S61, a statistic of the vehicle speed during running in the past is read. In the present embodiment, the vehicle speed during running of the vehicle is detected in another program and stored. A statistic processing is executed for the stored values to obtain a statistic such as an average value, an intermediate value, and an average value in a state in which the greatest load is imposed, and the obtained statistic is read. At S62, an inside temperature Ti at the current time is estimated based on, e.g., the read statistic. During running of the vehicle, the air stored in the tank 34 is warmed by, e.g., the output of the engine and exhaust gas and cooled by winds. Thus, the inside temperature Ti is estimated with consideration of these conditions. When the vehicle is stopped, the inside temperature Ti is estimated based on, e.g., a stopped time and a vehicle speed during running. For example, since the temperature in the system is high due to radiant heat within a set length of time after the vehicle is stopped, the temperature in the system is higher than that during running, and it is estimated that the temperature in the system is higher when the speed of the vehicle during running is high than when the speed of the vehicle during running is low. After the set length of time has passed after the vehicle is stopped, the inside temperature Ti gets closer to the outside-air temperature To with lapse of time. At S63, the temperature-dependent correction value ΔPi is obtained based on the estimated inside temperature Tis and the standard temperature Ts according to the table illustrated in FIG. 9, for example. The reference threshold values Pi, Pd are thereafter read, and the correction threshold values PAi, PAd are determined. In the present embodiment, an inside temperature estimator is constituted by the wheel speed sensors 99 and portions of the vehicle-height adjustment ECU 80 which store and execute the processings at S61 and S62 in the flow chart in FIG. 17, for example. As thus described, in the case where a length of time elapsed from the stop of the vehicle is short, not only the inside temperature Ti but also the outside-air temperature To increases by radiant heat in some case. In such a case, the outside-air temperature To may be corrected with consideration of the radiant heat.

It is noted that both of the air intake control and the air discharge control are not necessarily executed, and only one of the air intake control and the air discharge control may be executed without execution of the other. Also, the air intake control and the air discharge control may be executed independently of each other. For example, the air-intake control program and the air-discharge control program may be executed at different timings, for example.

It is to be understood that the disclosure is not limited to the details of the illustrated embodiments, but may be embodied with various changes and modifications, which may occur to those skilled in the art, without departing from the spirit and scope of the disclosure.

Claimable Inventions

There will be described inventions that are claimable in the present application.

(1) A vehicle-height adjustment system, comprising:
    a vehicle-height adjustment actuator provided so as to correspond to a wheel; and
    a pressure-medium supply and discharge device configured to supply and discharge a pressure medium to and from the vehicle-height adjustment actuator,
    wherein the pressure-medium supply and discharge device comprises a tank configured to store the pressure medium, and
    wherein the vehicle-height adjustment system comprises a tank-pressure controller configured to control a tank pressure based on a state of the vehicle-height adjustment system, wherein the tank pressure is a pressure of the pressure medium stored in the tank.

The tank pressure may be detected by a tank pressure sensor and may be estimated based on the state of the vehicle-height adjustment system.

(2) The vehicle-height adjustment system according to the above form (1), wherein the tank-pressure controller is configured to control the tank pressure based on at least one of (a) a vehicle height for a wheel which indicates the state of the vehicle-height adjustment system and (b) an inside temperature which is a temperature in the vehicle-height adjustment system.

(3) The vehicle-height adjustment system according to the above form (1) or (2),
    wherein the pressure-medium supply and discharge device comprises a pressure-medium supplier configured to supply the pressure medium to the tank, and
    wherein the tank-pressure controller comprises a supply controller configured to control the pressure-medium supplier to supply the pressure medium to the tank when the tank pressure is less than a supply start threshold value.

For example, a device such as a compressor device and a supply valve corresponds to the pressure-medium supplier.

(4) The vehicle-height adjustment system according to the above form (3), wherein the supply controller comprises a first vehicle-height-dependent changer configured to set the supply start threshold value to a smaller value when the vehicle height for the wheel is high than when the vehicle height for the wheel is low.

(5) The vehicle-height adjustment system according to the above form (3) or (4), wherein the supply controller comprises a first inside-temperature-dependent changer configured to set the supply start threshold value to a larger value when the inside temperature is high than when the inside temperature is low.

(6) The vehicle-height adjustment system according to any of the above forms (3) through (5), wherein the supply controller comprises a first temperature-difference-dependent changer configured to set the supply start threshold value to a larger value when the inside temperature is high with respect to a temperature of outside air than when the inside temperature is low with respect to the temperature of outside air.

The outside-air temperature as the temperature of the outside air may be replaced with a standard temperature. The standard temperature may be an average value of the outside-air temperatures.

The supply start threshold value may be set to a large value in the case where the inside temperature is higher than the outside-air temperature by a set value. In other words, in the case where a difference between the inside temperature and the outside-air temperature is small, the supply start threshold value is not necessarily set to a large value.

(7) The vehicle-height adjustment system according to any of the above forms (3) through (6), wherein the supply controller comprises a temporal changer configured to set the supply start threshold value to a larger value when the inside temperature is temporarily high by an engine of a vehicle.

A state in which the inside temperature is high due to heating of the inside of the system by the engine is one mode of the state in which the inside temperature is high with respect to the outside-air temperature. In this case, a load on vehicle is usually large.

(8) The vehicle-height adjustment system according to any of the above forms (1) through (7),
wherein the pressure-medium supply and discharge device comprises a pressure-medium discharger configured to discharge the pressure medium from the tank, and
wherein the tank-pressure controller comprises a discharge controller configured to control the pressure-medium discharger to discharge the pressure medium from the tank when the tank pressure is higher than a discharge start threshold value.

It is possible to consider that the pressure-medium discharger is constituted by devices including a discharge valve, for example.

(9) The vehicle-height adjustment system according to the above form (8), wherein the discharge controller comprises a second vehicle-height-dependent changer that changes the discharge start threshold value to a smaller value when the vehicle height for the wheel is high than when the vehicle height for the wheel is low.

(10) The vehicle-height adjustment system according to the above form (8) or (9), wherein the discharge controller comprises a second inside-temperature-dependent changer that changes the discharge start threshold value to a larger value when the inside temperature is high than when the inside temperature is low.

(11) The vehicle-height adjustment system according to any of the above forms (8) through (10), wherein the discharge controller comprises a second temperature-difference-dependent changer configured to set the discharge start threshold value to a larger value when the inside temperature is high with respect to a temperature of outside air than when the inside temperature is low with respect to the temperature of outside air.

(12) The vehicle-height adjustment system according to any of the above forms (1) through (11), wherein the discharge controller comprises at least one of (i) an inside temperature estimator that estimates the inside temperature based on a state of a vehicle in which the vehicle-height adjustment system is installed and (ii) a temperature difference estimator that estimates whether the inside temperature is high with respect to a temperature of outside air, based on the state of the vehicle in which the vehicle-height adjustment system is installed.

It is possible to estimate the inside temperature and a temperature difference based on, e.g., an operating state and a running speed of the engine installed in the vehicle. It is further possible to obtain the temperature difference based on the estimated inside temperature and the outside-air temperature.

(13) The vehicle-height adjustment system according to any one of the above forms (1) through (12), further comprising an inside temperature obtainer configured to obtain the inside temperature.

The inside temperature obtainer may be a temperature sensor that directly detects the inside temperature and may be an obtainer including a pressure sensor that detects a pressure in the system and configured to obtain a change of temperature based on a change of the pressure to obtain the inside temperature.

(14) A vehicle-height adjustment system, comprising:
a vehicle-height adjustment actuator provided so as to correspond to a wheel; and
a pressure-medium supply and discharge device configured to supply and discharge a pressure medium to and from the vehicle-height adjustment actuator,
wherein the pressure-medium supply and discharge device comprises:
a tank configured to store the pressure medium;
a pressure-medium supplier configured to supply the pressure medium to the tank; and
a tank-pressure controller configured to control a tank pressure based on a state of the vehicle-height adjustment system, wherein the tank pressure is a pressure of the pressure medium stored in the tank.

The vehicle-height adjustment system according to this form may include technical features according to any one of the above forms (1) through (13).

(15) A vehicle-height adjustment system, comprising:
a vehicle-height adjustment actuator provided so as to correspond to a wheel; and
a pressure-medium supply and discharge device configured to supply and discharge a pressure medium to and from the vehicle-height adjustment actuator,
wherein the pressure-medium supply and discharge device comprises:
a tank configured to store the pressure medium;
a pressure-medium discharger configured to discharge the pressure medium from the tank; and
a tank-pressure controller configured to control a tank pressure based on a state of the vehicle-height adjustment system, wherein the tank pressure is a pressure of the pressure medium stored in the tank.

The vehicle-height adjustment system according to this form may include technical features according to any one of the above forms (1) through (13).

What is claimed is:
1. A vehicle-height adjustment system, comprising:
a vehicle-height adjustment actuator provided so as to correspond to a wheel; and
a pressure-medium supply and discharge device configured to supply and discharge a pressure medium to and from the vehicle-height adjustment actuator,
wherein the pressure-medium supply and discharge device comprises a tank configured to store the pressure medium, and
wherein the vehicle-height adjustment system comprises a tank-pressure controller configured to control a tank pressure based on a vehicle height for the wheel and an inside temperature, wherein the tank pressure is a pressure of the pressure medium stored in the tank, and the inside temperature is a temperature in the vehicle-height adjustment system.

2. The vehicle-height adjustment system according to claim 1,
wherein the pressure-medium supply and discharge device comprises a pressure-medium supplier configured to supply the pressure medium to the tank, and
wherein the tank-pressure controller comprises a supply controller configured to control the pressure-medium supplier to supply the pressure medium to the tank when the tank pressure is less than a supply start threshold value.

3. The vehicle-height adjustment system according to claim 2, wherein the supply controller comprises a first vehicle-height-dependent changer configured to set the supply start threshold value in a case where the vehicle height for the wheel is high to a value less than the supply start threshold value in a case where the vehicle height for the wheel is low.

4. The vehicle-height adjustment system according to claim 2, wherein the supply controller comprises a first inside-temperature-dependent changer configured to set the supply start threshold value in a case where the inside temperature is high to a value greater than the supply start threshold value in a case where the inside temperature is low.

5. The vehicle-height adjustment system according to claim 4, wherein the first inside-temperature-dependent changer is configured to obtain a correction value based on the inside temperature; set a correction air-intake start threshold value by adding the correction value to the supply start threshold value; set the correction value larger when the inside temperature is high than when the inside temperature is low; and set the correction value to zero in a case where the inside temperature is equal to a standard temperature.

6. The vehicle-height adjustment system according to claim 2,
wherein a temperature difference is a value obtained by subtracting, from the inside temperature, an outside-air temperature that is a temperature of outside air, and
wherein the supply controller comprises a first temperature-difference-dependent changer configured to set the supply start threshold value in a case where the temperature difference is large to a value greater than the supply start threshold value in a case where the temperature difference is small.

7. The vehicle-height adjustment system according to claim 1,
wherein the pressure-medium supply and discharge device comprises a pressure-medium discharger configured to discharge the pressure medium from the tank, and
wherein the tank-pressure controller comprises a discharge controller configured to control the pressure-medium discharger to discharge the pressure medium from the tank when the tank pressure is higher than a discharge start threshold value.

8. The vehicle-height adjustment system according to claim 7, wherein the discharge controller comprises a second inside-temperature-dependent changer configured to set the discharge start threshold value in a case where the inside temperature is high to a value greater than the discharge start threshold value in a case where the inside temperature is low.

9. The vehicle-height adjustment system according to claim 8, wherein the second inside-temperature-dependent changer is configured to obtain a correction value based on the inside temperature; set a correction air-discharge start threshold value by adding the correction value to the discharge start threshold value; set the correction value larger when the inside temperature is high than when the inside temperature is low; and set the correction value to zero in a case where the inside temperature is equal to a standard temperature.

10. The vehicle-height adjustment system according to claim 7,
wherein a temperature difference is a value obtained by subtracting, from the inside temperature, an outside-air temperature that is a temperature of outside air, and
wherein the discharge controller comprises a second temperature-difference-dependent changer configured to set the discharge start threshold value in a case where the temperature difference is large to a value greater than the discharge start threshold value in a case where the temperature difference is small.

11. The vehicle-height adjustment system according to claim 1, wherein the discharge controller comprises a second vehicle-height-dependent changer configured to set the discharge start threshold value in a case where the vehicle height for the wheel is high to a value less than the discharge start threshold value in a case where the vehicle height for the wheel is low.

12. The vehicle-height adjustment system according to claim 1, wherein the tank-pressure controller comprises an inside temperature obtainer configured to obtain the inside temperature.

13. The vehicle-height adjustment system according to claim 1,
wherein the pressure-medium supply and discharge device comprises a pressure-medium supplier configured to supply the pressure medium to the tank,
wherein the tank-pressure controller comprises a supply controller configured to control the pressure-medium supplier to supply the pressure medium to the tank when the tank pressure is less than a supply start threshold value, and
wherein the supply controller comprises (i) a first vehicle-height-dependent changer configured to set the supply start threshold value in a case where the vehicle height for the wheel is high to a value less than the supply start threshold value in a case where the vehicle height for the wheel is low, and (ii) a first inside-temperature-dependent changer configured to set the supply start threshold value in a case where the inside temperature is high to a value greater than the supply start threshold value in a case where the inside temperature is low.

14. The vehicle-height adjustment system according to claim 1,
wherein the pressure-medium supply and discharge device comprises a pressure-medium discharger configured to discharge the pressure medium from the tank,
wherein the tank-pressure controller comprises a discharge controller configured to control the pressure-medium discharger to discharge the pressure medium from the tank when the tank pressure is higher than a discharge start threshold value, and
wherein the discharge controller comprises (i) a second vehicle-height-dependent changer configured to set the discharge start threshold value in a case where the vehicle height for the wheel is high to a value less than the discharge start threshold value in a case where the vehicle height for the wheel is low, and (ii) a second inside-temperature-dependent changer configured to set the discharge start threshold value in a case where the inside temperature is high to a value greater than the discharge start threshold value in a case where the inside temperature is low.

* * * * *